US012159352B2

(12) United States Patent
Choi et al.

(10) Patent No.: US 12,159,352 B2
(45) Date of Patent: Dec. 3, 2024

(54) EXTENDED REALITY MOVEMENT PLATFORM

(71) Applicant: BSSET LLC, Peachtree City, GA (US)

(72) Inventors: Samuel Choi, Peachtree City, GA (US); Jeanie Choi, Peachtree City, GA (US)

(73) Assignee: BSSET LLC, Peachtree City, GA (US)

( * ) Notice: Subject to any disclaimer, the term of this patent is extended or adjusted under 35 U.S.C. 154(b) by 120 days.

(21) Appl. No.: 17/897,401

(22) Filed: Aug. 29, 2022

(65) Prior Publication Data

US 2023/0068927 A1 Mar. 2, 2023

Related U.S. Application Data

(60) Provisional application No. 63/238,267, filed on Aug. 30, 2021.

(51) Int. Cl.
*G06T 19/00* (2011.01)
*G06F 3/01* (2006.01)
*H04N 13/373* (2018.01)
*H04N 13/38* (2018.01)

(52) U.S. Cl.
CPC .......... *G06T 19/003* (2013.01); *G06F 3/015* (2013.01); *G06T 19/006* (2013.01); *H04N 13/373* (2018.05); *H04N 13/38* (2018.05)

(58) Field of Classification Search
CPC ..... G06T 19/003; G06T 19/006; H04N 13/38; H04N 13/373; G06F 3/015
See application file for complete search history.

(56) References Cited

U.S. PATENT DOCUMENTS

| 5,999,187 | A | * | 12/1999 | Dehmlow | G06F 15/00 382/199 |
| 6,570,563 | B1 | * | 5/2003 | Honda | A63F 13/352 345/473 |
| 9,392,212 | B1 | * | 7/2016 | Ross | H04N 5/9305 |
| 9,672,416 | B2 | * | 6/2017 | Zhang | G06F 3/011 |
| 9,996,149 | B1 | * | 6/2018 | Martin | G06F 3/0338 |
| 10,413,230 | B1 | * | 9/2019 | Berme | G06T 19/006 |
| 10,460,524 | B2 | * | 10/2019 | McGrath | G06F 3/0354 |
| 10,564,801 | B2 | * | 2/2020 | Baba | G06T 19/20 |
| 10,832,483 | B2 | * | 11/2020 | Oh | G06F 3/015 |
| 11,012,677 | B1 | * | 5/2021 | Bleyer | H04N 13/296 |
| 11,095,855 | B2 | * | 8/2021 | Lyon | G06T 19/003 |

(Continued)

OTHER PUBLICATIONS

"Simple, Impactful, Innovation" article, nVSM Technology | Otolith. com, https://otolithlabs.com/nvsmtechnology/, 8 pgs. (retrieved Aug. 29, 2022).

(Continued)

*Primary Examiner* — Charles L Beard
(74) *Attorney, Agent, or Firm* — BEKIARES ELIEZER LLP

(57) ABSTRACT

The present disclosure generally relates to a method of moving a user through an extended reality environment. Through comparing movement of a head mounted display to a user's established reference position, one or more sensors can determine movement of the user in the extended reality environment. The movement of the user in the extended reality environment corresponds to the anticipated movement of the user's vestibular system as determined by the movement and angle of the head mounted device.

20 Claims, 12 Drawing Sheets

(56) References Cited

U.S. PATENT DOCUMENTS

| | | | | |
|---|---|---|---|---|
| 11,194,386 B1* | 12/2021 | Zhao | | G06F 3/011 |
| 11,218,522 B1* | 1/2022 | Yerli | | G06T 19/00 |
| 11,250,617 B1* | 2/2022 | Sempe | | H04L 65/611 |
| 11,301,045 B1* | 4/2022 | Berme | | G06F 3/016 |
| 11,436,806 B1* | 9/2022 | Katz | | A61B 5/7425 |
| 11,769,299 B1* | 9/2023 | Stehlik | | G06T 7/80 |
| | | | | 345/419 |
| 11,847,297 B2* | 12/2023 | Kim | | G06Q 50/40 |
| 2001/0056574 A1* | 12/2001 | Richards | | H04N 7/002 |
| | | | | 348/E7.071 |
| 2008/0215994 A1* | 9/2008 | Harrison | | H04L 67/131 |
| | | | | 715/757 |
| 2009/0091571 A1* | 4/2009 | Zalewski | | G06Q 30/0244 |
| | | | | 705/14.1 |
| 2010/0169797 A1* | 7/2010 | Lynk | | G06F 3/04815 |
| | | | | 715/757 |
| 2012/0044365 A1* | 2/2012 | Shuster | | G02B 27/017 |
| | | | | 348/207.1 |
| 2013/0162632 A1* | 6/2013 | Varga | | H04N 13/383 |
| | | | | 345/419 |
| 2014/0361976 A1* | 12/2014 | Osman | | G02B 27/017 |
| | | | | 345/156 |
| 2015/0230020 A1* | 8/2015 | Jeon | | H04R 5/0335 |
| | | | | 381/74 |
| 2016/0042566 A1* | 2/2016 | Mao | | A63F 13/213 |
| | | | | 463/31 |
| 2016/0077547 A1* | 3/2016 | Aimone | | A61B 5/6814 |
| | | | | 345/8 |
| 2016/0187969 A1* | 6/2016 | Larsen | | G02B 27/0093 |
| | | | | 345/156 |
| 2016/0189429 A1* | 6/2016 | Mallinson | | G02B 27/017 |
| | | | | 345/633 |
| 2016/0195923 A1* | 7/2016 | Nauseef | | A47C 7/72 |
| | | | | 297/344.21 |
| 2016/0196765 A1* | 7/2016 | Stauch | | G09B 19/00 |
| | | | | 434/236 |
| 2016/0228771 A1* | 8/2016 | Watson | | A63F 13/285 |
| 2016/0262608 A1* | 9/2016 | Krueger | | G16H 40/63 |
| 2016/0267720 A1* | 9/2016 | Mandella | | G06F 3/03545 |
| 2017/0024932 A1* | 1/2017 | Sugaya | | G02B 27/0093 |
| 2017/0076486 A1* | 3/2017 | Aizawa | | G06F 1/163 |
| 2017/0076503 A1* | 3/2017 | Tamaoki | | G06F 3/017 |
| 2017/0084084 A1* | 3/2017 | Durham | | G06F 3/04842 |
| 2017/0092235 A1* | 3/2017 | Osman | | G09G 5/38 |
| 2017/0113056 A1* | 4/2017 | Stocco | | A61N 1/0476 |
| 2017/0132845 A1* | 5/2017 | Everman, II | | G06F 3/017 |
| 2017/0249010 A1* | 8/2017 | Jung | | G06F 3/017 |
| 2017/0266554 A1* | 9/2017 | Marks | | A63F 13/5255 |
| 2017/0293356 A1* | 10/2017 | Khaderi | | G02B 27/0172 |
| 2017/0323483 A1* | 11/2017 | Palmaro | | G06T 19/00 |
| 2018/0004286 A1* | 1/2018 | Chen | | G06F 3/0481 |
| 2018/0005429 A1* | 1/2018 | Osman | | A63F 13/56 |
| 2018/0075653 A1* | 3/2018 | Schillings | | A63B 71/0622 |
| 2018/0089901 A1* | 3/2018 | Rober | | G06V 20/56 |
| 2018/0165887 A1* | 6/2018 | Iwai | | A63F 13/86 |
| 2018/0189555 A1* | 7/2018 | Satake | | G06F 3/013 |
| 2018/0190010 A1* | 7/2018 | Sawaki | | G06F 3/011 |
| 2018/0204380 A1* | 7/2018 | Kumar | | G06F 3/0346 |
| 2018/0224930 A1* | 8/2018 | Folmer | | G06F 13/20 |
| 2018/0232051 A1* | 8/2018 | Wu | | G06V 40/23 |
| 2018/0239144 A1* | 8/2018 | Woods | | A63F 13/213 |
| 2018/0239430 A1* | 8/2018 | Tadi | | A61B 5/0036 |
| 2018/0247453 A1* | 8/2018 | Nakashima | | G09G 5/00 |
| 2018/0256115 A1* | 9/2018 | Campbell | | A61B 5/4023 |
| 2018/0256976 A1* | 9/2018 | McHale | | A63F 13/525 |
| 2018/0279944 A1* | 10/2018 | Aiston | | A61B 5/291 |
| 2018/0286122 A1* | 10/2018 | Nakashima | | A63F 13/795 |
| 2018/0300926 A1* | 10/2018 | Inomata | | G06F 3/011 |
| 2018/0302499 A1* | 10/2018 | Kada | | H04L 67/131 |
| 2018/0304153 A1* | 10/2018 | Hohjoh | | A63F 13/211 |
| 2018/0311585 A1* | 11/2018 | Osman | | A63F 13/26 |
| 2018/0322681 A1* | 11/2018 | Inomata | | A63F 13/211 |
| 2018/0329486 A1* | 11/2018 | Williams | | G02B 27/017 |
| 2018/0329603 A1* | 11/2018 | Sawaki | | G02B 27/017 |
| 2018/0330536 A1* | 11/2018 | Sawaki | | G06F 3/012 |
| 2018/0341386 A1* | 11/2018 | Inomata | | A63F 13/211 |
| 2018/0376073 A1* | 12/2018 | Shi | | H04N 7/15 |
| 2019/0005717 A1* | 1/2019 | Singh | | G06T 15/80 |
| 2019/0018498 A1* | 1/2019 | West | | G06F 3/012 |
| 2019/0079599 A1* | 3/2019 | Lee | | G06F 3/0346 |
| 2019/0121515 A1* | 4/2019 | Nashida | | G06T 19/006 |
| 2019/0134468 A1* | 5/2019 | Schillings | | A63H 29/24 |
| 2019/0146653 A1* | 5/2019 | Ikuta | | G06F 3/01 |
| | | | | 715/863 |
| 2019/0171281 A1* | 6/2019 | Hayashida | | A63F 13/87 |
| 2019/0278295 A1* | 9/2019 | Matsuno | | B25J 9/0084 |
| 2019/0313915 A1* | 10/2019 | Tzvieli | | G01J 5/12 |
| 2019/0333261 A1* | 10/2019 | Nakashima | | G06F 3/011 |
| 2019/0342632 A1* | 11/2019 | DeFaria | | G06T 15/20 |
| 2020/0082638 A1* | 3/2020 | Rober | | B60W 10/04 |
| 2020/0133405 A1* | 4/2020 | Chan | | G02B 27/0179 |
| 2020/0197825 A1* | 6/2020 | Bear | | A63F 13/5255 |
| 2020/0234813 A1* | 7/2020 | Orr | | G16H 50/30 |
| 2020/0241292 A1* | 7/2020 | Degges, Jr. | | A63F 13/40 |
| 2020/0249748 A1* | 8/2020 | Ranganathan | | A63F 13/40 |
| 2020/0249749 A1* | 8/2020 | Akman | | G06F 3/04815 |
| 2020/0265649 A1* | 8/2020 | Chaurasia | | G06T 7/70 |
| 2020/0286289 A1* | 9/2020 | Mitchell | | G01C 15/002 |
| 2020/0319471 A1* | 10/2020 | Goslin | | G02B 27/0179 |
| 2020/0326544 A1* | 10/2020 | Wan | | G01B 7/004 |
| 2020/0334461 A1 | 10/2020 | Rabinovich et al. | | |
| 2020/0341541 A1* | 10/2020 | Olah-Reiken | | G06F 3/011 |
| 2020/0366886 A1 | 11/2020 | Giokaris et al. | | |
| 2020/0371738 A1* | 11/2020 | Orr | | G16H 80/00 |
| 2020/0401214 A1* | 12/2020 | Orr | | G06T 11/00 |
| 2021/0011607 A1* | 1/2021 | Ziman | | G06T 19/003 |
| 2021/0019036 A1* | 1/2021 | Wang | | G06F 3/0346 |
| 2021/0026443 A1* | 1/2021 | Akman | | G06F 3/011 |
| 2021/0044779 A1* | 2/2021 | Prins | | H04L 12/1827 |
| 2021/0046391 A1* | 2/2021 | Board | | A63G 31/16 |
| 2021/0055794 A1* | 2/2021 | Lee | | G06F 3/013 |
| 2021/0082187 A1* | 3/2021 | Gavriliuc | | G06F 3/016 |
| 2021/0116994 A1* | 4/2021 | Woods | | G06F 3/012 |
| 2021/0132380 A1* | 5/2021 | Wieczorek | | A63F 13/428 |
| 2021/0141448 A1* | 5/2021 | Woods | | G06F 3/0346 |
| 2021/0157402 A1* | 5/2021 | Parshionikar | | G06F 3/012 |
| 2021/0271372 A1* | 9/2021 | Ziman | | G06F 3/04815 |
| 2021/0390766 A1* | 12/2021 | Schouela | | G06F 3/011 |
| 2021/0400249 A1* | 12/2021 | Edmonds | | G06T 7/40 |
| 2022/0043263 A1* | 2/2022 | Wieczorek | | A63F 13/212 |
| 2022/0070235 A1* | 3/2022 | Yerli | | G06F 3/011 |
| 2022/0084301 A1* | 3/2022 | Joshi | | G06F 3/011 |
| 2022/0124286 A1* | 4/2022 | Punwani | | H04L 65/1069 |
| 2022/0214743 A1* | 7/2022 | Dascola | | G06F 3/017 |
| 2022/0253126 A1* | 8/2022 | Holland | | G06F 3/011 |
| 2022/0291744 A1* | 9/2022 | Sugihara | | G06F 3/013 |
| 2022/0358726 A1* | 11/2022 | Teixido | | A61B 5/4023 |
| 2022/0405996 A1* | 12/2022 | Shirai | | A63F 13/86 |
| 2022/0406473 A1* | 12/2022 | Arbel | | G06F 3/1454 |
| 2022/0410006 A1* | 12/2022 | Watanabe | | A63F 13/60 |
| 2023/0038695 A1* | 2/2023 | Yee | | G06F 3/015 |
| 2023/0126008 A1* | 4/2023 | Komatsu | | G06F 3/011 |
| | | | | 434/47 |
| 2023/0280828 A1* | 9/2023 | Fung | | A61B 5/165 |
| 2023/0288985 A1* | 9/2023 | Damveld | | G06F 3/013 |
| 2023/0316663 A1* | 10/2023 | Yerli | | G06T 19/006 |
| | | | | 345/633 |
| 2023/0316674 A1* | 10/2023 | Boesel | | G06F 3/012 |
| | | | | 345/633 |
| 2023/0335139 A1* | 10/2023 | Breton | | G06F 3/167 |
| 2023/0367386 A1* | 11/2023 | Wilson | | G06F 3/012 |
| 2023/0419855 A1* | 12/2023 | Wallace | | G06T 19/006 |
| 2024/0005622 A1* | 1/2024 | Lee | | G06F 3/013 |
| 2024/0046541 A1* | 2/2024 | Shirai | | G06T 19/003 |
| 2024/0051143 A1* | 2/2024 | Dong | | G06F 3/014 |
| 2024/0061499 A1* | 2/2024 | Saragih | | G06F 3/012 |
| 2024/0066410 A1* | 2/2024 | Lal | | A63F 13/212 |
| 2024/0069625 A1* | 2/2024 | Lal | | G06F 3/011 |
| 2024/0071007 A1* | 2/2024 | Vaish | | H04N 5/268 |

(56) References Cited

U.S. PATENT DOCUMENTS

2024/0077937 A1* 3/2024 Rickwald ............ G02B 27/0093
2024/0169676 A1* 5/2024 Kemeny ............... G06T 19/003

OTHER PUBLICATIONS

Palmisano et al., "Cybersickness in Head-Mounted Displays is Caused by Differences in the User's Virtual and Physical Head Pose", Frontiers, https://www.frontiersin.org/articles/10.3389/frvir.2020.587698/full, 78 pgs. (retrieved Aug. 29, 2022).

Technology : vMocion : Putting the Motion in Virtual Reality™ article, https://www.vmocion.com/technology.html, 3 pgs. (retrieved Aug. 29, 2022).

Tregillus et al., "Handsfree Omnidirectional VR Navigation using Head Tilt", Experiences with Virtual Reality, CHI 2017. May 6-11, 2017, Denver, CO, USA, DOI: http://dx.doi.org/10.1145/3025453.3025521, pp. 4063-4068.

* cited by examiner

EXTENDED REALITY MOVEMENT PLATFORM

RELATED APPLICATION

Under provisions of 35 U.S.C. § 119(e), the Applicant claims benefit of U.S. Provisional Application No. 63/238,267 filed on Aug. 30, 2021, and having inventors in common, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to movement of a user in an extended reality environment (e.g., a mixed reality environment, an augmented reality environment, a virtual reality environment, and/or the like).

BACKGROUND

Conventional systems and strategies for facilitating movement in a virtual environment include, for example, the use of a controller, such as a traditional trackpad or joystick, or point-and-shoot teleportation. The conventional systems and strategies are, however, deficient in providing the user with an accurate way to move through a virtual reality environment due to their reliance on mechanisms unrelated to how the human body moves throughout the physical world. Problems can arise because the conventional strategy does not consider the resulting imbalance in the human vestibular system the brain expects with these conventional types of movement. This discrepancy could lead to nausea or motion sickness in the user. These systems can result in conflicting signals being received by the brain where the signals from the vestibular system do not match what the users' eyes are seeing in the virtual reality environment. The conflicting signals can lead to a disturbance of the brain's equilibrium resulting not only in nausea or motion sickness, but other types of simulator sickness as well, such as headaches, sweating, fatigue, eye strain, and a general lack of balance.

The conventional strategy of moving through a virtual environment using joysticks or point-and-shoot teleportation fails to provide users with any means to connect the movement inputs of their controller to the signals needed to maintain the brain's equilibrium. Accordingly, there is a need for improving strategies of movement in an extended reality environment to provide users a means of movement that is fully immersive while stimulating the vestibular system, which helps to reduce or eliminate any of a plethora of motion and/or simulator sicknesses.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The present disclosure provides a method for moving a user throughout an extended reality environment (e.g., a mixed reality environment, an augmented reality environment, a virtual reality environment, and/or the like) through the utilization of a series of triggers, reference positions, and sensor data analysis in such a way as to stimulate the user's vestibular system. When a trigger is received a reference position of a head mounted device is captured through measurements by an array of sensors along a plurality of axes. Subsequent movement of the head-mounted device is then captured by sensors and compared to the reference position. In line with the present disclosure, the platform may continuously or periodically detect one or more subsequent positions of the head mounted device. Additionally or alternatively, the head mounted device may measure the position of the head mounted device periodically to determine the position of the head mounted device. The collected data corresponding to the movement of the head-mounted device and the user's head movement is utilized to determine the translational movement of the user in the extended reality environment.

In addition to translational movement, the method of the present disclosure can also determine elevation change of a user's movement within an extended reality environment. With the user's translational movement determined by the first reference position, a user can activate a second trigger, which will maintain the current translational movement and create a second reference position of the head-mounted device. The second reference position then utilizes sensor data corresponding to the pitch of the head-mounted device to control the elevation change of the user's established translational movement. In this way the method of the present disclosure can control both the translation as well as elevation change of a user's movement within an extended reality environment.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1A:
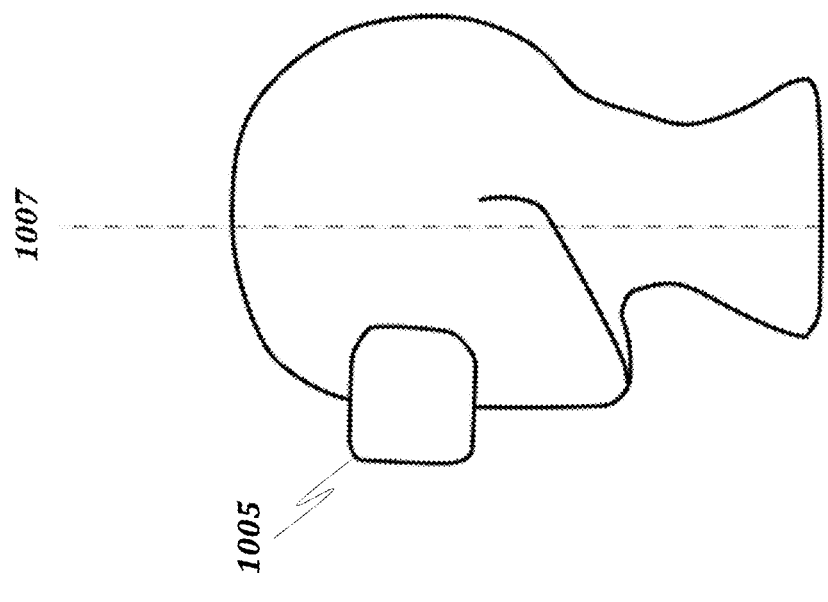
FIG. 1A illustrates a head mounted device located along the vertical axis from the actual ground plane in accordance with embodiments of the present disclosure; a system utilizing a button press as the trigger mechanism to initiate the movement state of the system in accordance with embodiments of the present disclosure.
Figure 1A:
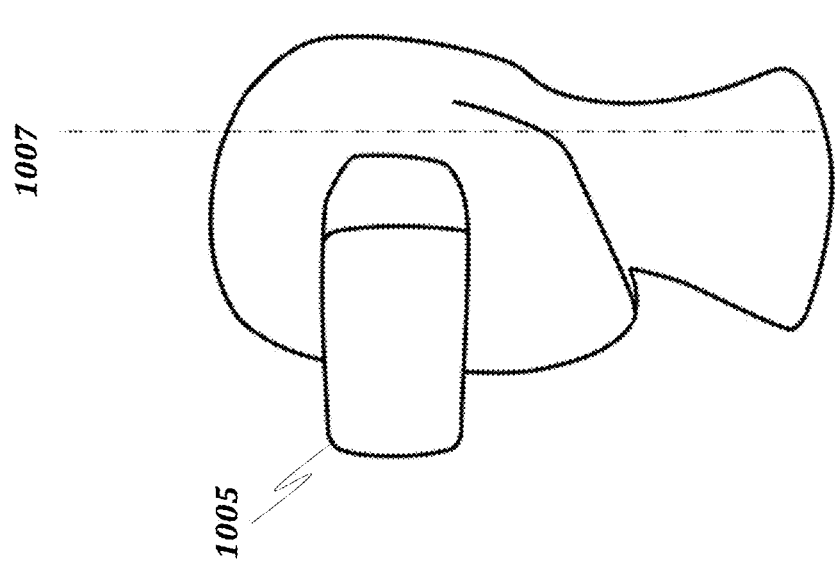

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, of which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features of an extended reality movement platform. Moreover, while many aspects and features relate to, and are described in, the context of virtual reality, embodiments of the present disclosure are not limited to use only in this context. For example, the adaptation of the embodiments disclosed herein for any extended reality environment (e.g., a mixed reality environment, an augmented reality environment, a virtual reality environment, and/or the like), and/or to the remote operation of motorized vehicles, drones, or robots may be contemplated to be within the spirit and scope of the present disclosure.

I. PLATFORM OVERVIEW

This overview is provided to introduce a selection of concepts in a simplified form that are further described below. This overview is not intended to identify key features or essential features of the claimed subject matter. Nor is this overview intended to be used to limit the claimed subject matter's scope.

To address the problems of conventional systems and strategies, the present disclosure provides a platform for moving throughout an extended reality environment (e.g., a mixed reality environment, an augmented reality environment, a virtual reality environment, and/or the like) that is immersive without inducing motion sickness. The platform may be configured to stimulate a user's vestibular system through the use of sensors monitoring the movement of a head-mounted device and determining the best fit velocity to move a user throughout an extended reality environment. By implementing a platform that takes the balance system of the inner ear's vestibular system into account, the platform can greatly reduce motion sickness without relying on the conventional immersion-breaking methods.

The platform of the present disclosure may, in some embodiments, comprise a movement system for an extended reality environment that utilizes a trigger to capture reference positions of a user head mounted device. Triggers can be linked with other devices to create a movement system. One possible configuration could include the trigger located on a handheld controller that is paired to a virtual reality headset worn on a user's head that is equipped with sensors to detect the head movement of the user. Once the trigger has been activated it can initiate the operation of the headset to read sensor data from the virtual reality headset and derive motion data of the user. As the user moves their head with the trigger activated, the platform is capable of transforming captured sensor data into motion data. The motion data, in turn, may be used to simulate a translational movement and/or elevation change of a user in the virtual reality environment that can be displayed by a user interface display on the virtual reality headset. The display can be used to assist the user with navigation throughout a virtual environment.

In some embodiments, the motion data may be conveyed in a set of computer-executable instructions. The set of instructions may be transmitted to processing module. The processing module may be, for example, but not be limited to, a game console, mobile device, gaming engine, graphics engine, or a remote controller of an unmanned aerial vehicle (UAV). Thus, it is not necessary for the platform to comprise an actual user interface display that is manipulated by the derived motion data.

Embodiments of the present disclosure may comprise methods, systems, and a computer readable medium comprising, but not limited to, at least one of the following:
A. A Controller Module;
B. A Head Mounted Display Module;
C. A Sensor Module; and
D. A Processing Module.

Details with regards to each module is provided below. Although modules are disclosed with specific functionality, it should be understood that functionality may be shared between modules, with some functions split between modules, while other functions are duplicated by the modules. Furthermore, the name of the module should not be construed as limiting upon the functionality of the module. Moreover, each component disclosed within each module can be considered independently without the context of the other components within the same module or different modules. Each component may contain language defined in other portions of these specifications. Each component disclosed for one module may be mixed with the functionality of another module. In the present disclosure, each component can be claimed on its own and/or interchangeably with other components of other modules.

The following depicts an example of a method of a plurality of methods that may be performed by at least one of the aforementioned modules, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one such computing device 900 may be employed in the performance of some or all of the stages disclosed with regard to the methods. Similarly, an apparatus may be employed in the performance of some or all of the stages of the methods. As such, the apparatus may comprise at least those architectural components as found in computing device 900.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the modules disclosed herein. The method may be embodied as, for example, but not limited to, computer instructions, which when executed, perform the method. The method may comprise the following stages, in no particular order:
1. Receiving a first trigger to set a first reference position for a head-mounted device;
2. Collecting sensor data from the head-mounted device;
3. Processing the sensor data from the head-mounted device to determine a first reference head position;
4. Collecting subsequent sensor data from the head mounted device;
5. Processing the subsequent sensor data to determine a subsequent head position;
6. Comparing the subsequent head position to the first reference head position;
7. Determining a translational movement vector of a user avatar based on the comparison of the subsequent head position to the first reference head position; and
8. Converting the determined movement vector into one or more computer executable instructions.

In some embodiments, additional stages may comprise, but not be limited to, for example:

9. Displaying the determined translational movement vector on the head-mounted device, based on the generated computer-executable instructions.
10. Receiving a second trigger to: a) maintain the translational movement vector of the user avatar, and b) set a second reference position for the head-mounted device;
11. Collecting second subsequent sensor data from the head-mounted device;
12. Processing the second subsequent sensor data from the head-mounted device to determine a second subsequent head position;
13. Comparing second subsequent head position to the second reference position;
14. Determining elevation change vector of the user avatar based on the comparison of the second subsequent head position and the second reference position (e.g., a change in pitch of the head position); and
15. Converting the determined elevation change into one or more computer executable instructions.

Although the aforementioned method has been described to be performed by the platform 100, it should be understood that computing device 900 may be used to perform the various stages of the method. Furthermore, in some embodiments, different operations may be performed by different networked elements in operative communication with computing device 900. For example, a plurality of computing devices may be employed in the performance of some or all of the stages in the aforementioned method. Moreover, a plurality of computing devices may be configured much like a single computing device 900. Similarly, an apparatus may be employed in the performance of some or all stages in the method. The apparatus may also be configured like computing device 900.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. PLATFORM CONFIGURATION

Figure 5:
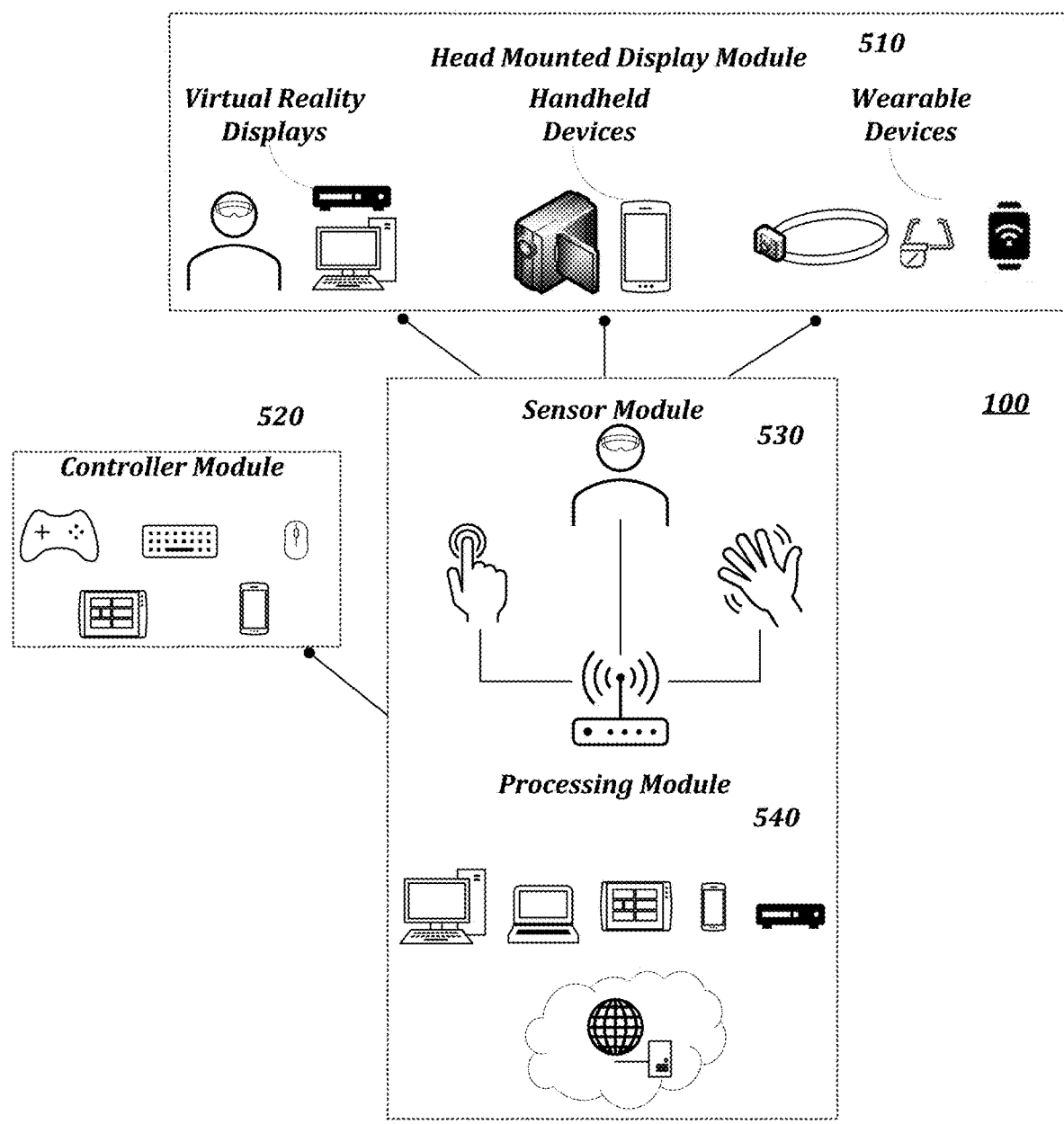
FIG. 5 illustrates a block diagram of an operating environment consistent with the present disclosure.

FIG. 5 illustrates how modules of the system can be connected to provide an extended reality movement platform 100. As shown in FIG. 5, embodiments of the present disclosure provide a software and/or hardware platform 100 comprised of a distributed set of computing elements, including, but not limited to:

A. Controller Module

In some embodiments consistent with the present disclosure, the platform 100 may include a controller module 520. The controller module 520 may comprise a plurality of different buttons, switches, or other interactive surfaces used to operate a computing device 900. For example, the controller module may include a game controller, a keyboard, a touchscreen, a pointing device (e.g., a mouse or trackpad), a tablet, a smartphone, or any other human-computer interface device configured to receive input from a user. In some embodiments, the computing device 900 may be embodied as a headset configured to display an extended reality environment and/or a graphical user interface (GUI) to an end-user. In embodiments, the extended reality environment may comprise, by way of non-limiting example, an extended reality environment, an augmented reality environment, a virtual reality environment, a mixed reality environment, and/or combinations thereof.

The interactive surfaces of the controller module 520 may enable a user to control one or more aspects of the extended reality environment displayed to the user. In some embodiments, the extended reality environment can correspond to a user's movement when remotely operating a vehicle such as the operation of a remote UAV displayed within a virtual reality environment in the user's headset. In this way, the user may be able to perform such actions as initiating the method of propagating or simulating propagation of the present disclosure, interfacing with different aspects of the virtual environment, or controlling different parameters about the functioning of the platform 100.

In some embodiments, the controller module 520 may provide a trigger mechanism for the user to initiate the method of moving consistent with the present disclosure. Having the trigger mechanism on the controller module 520 allows for the user to easily initiate the method of moving as disclosed and allow for the user to move throughout the virtual environment. In some embodiments, the trigger mechanism may comprise a physical trigger, button, or toggle on the controller module 520. Alternatively or additionally, the trigger mechanism may comprise a brainwave scanner, an electroencephalogram (EEG) reader, or any other device that allows the user to communicate an intention to trigger an event. In this way, the controller module 520 may have all trigger mechanisms required for a user to control movement within the extended reality environment within reach of the user. In embodiments, the trigger mechanisms are positioned in an easily accessible area for the user, enabling seamless integration of the present method into existing extended reality systems. In some embodiments, the controller mechanism 520 may provide navigation controls for the user. The navigation controls may allow the user to interface with the extended reality environment in a way that would be unreasonable to accomplish using the presently disclosed method. In this way, the user may not be limited to a single means of interacting with the extended reality environment, expanding the accessibility of the extended reality environment to which the method is implemented.

As discussed above, in some embodiments consistent with the present disclosure, the trigger mechanism can be a button or switch. The use of a button or a switch as the trigger mechanism allows the method to use a binary indicator that can be located quickly on a controller or other device while the user is immersed within a virtual environment for easy integration of a control system that seeks to employ the present method. In this way, the user may be able to initiate the means for moving throughout the environment directly from a controller that can also be used for additional operations when interfacing with the virtual reality environment. In other embodiments, the trigger mechanism may comprise a brainwave scanner, an electroencephalogram (EEG) reader, or any other device that allows the user to communicate an intention to trigger an event.

In some embodiments consistent with the present disclosure, the navigation controls can provide the user with additional means to move throughout the extended reality environment. The navigation controls may allow the user to interact with the extended reality environment independently from the means of locomotion, further expanding the immersion capabilities of the present system.

B. Head Mounted Display Module

In some embodiments consistent with the present disclosure, the platform 100 may include a head mounted display

510. The head mounted display 510 may include a display that can be used to operate (e.g., display output from and/or provide input to) the computing device 900. The head mounted display 510 may include, for example, an extended reality display device or headset, a handheld device, such as a tablet or smartphone, a wearable device (e.g., smart glasses, a head-mounted display, a device configured to project directly into a user's eye, etc.), and/or the like. In some embodiments, the head mounted display may provide a graphical user interface (GUI) displayable to the end user. The GUI may include an extended reality environment and/or one or more overlays displaying information related to the extended reality environment. The head mounted display 510 can be configured to display the extended reality environment and/or other notifications or indications to the user.

In embodiments, the head mounted display 510 may further comprise one or more sensors for collecting information associated with a position of a user's head. The one or more sensors may include a motion sensor, a gyroscope, a level, or any other sensor useful for providing data indicating a position and/or orientation of the user's head in a three-dimensional space (e.g., based on a cartesian, cylindrical, or spherical coordinate system). In this way, the head mounted display module 510 may allow a user may properly view the extended reality environment and enable the computing device 900 to collect accurate sensor data based on the movement of the user's head.

In further embodiments, the headset may provide the user with a heads-up display (HUD) that may be utilized for various applications in the extended reality environment. In this way the head mounted display 510 may provide the user with the optical stimulation needed to properly immerse and interact with the extended reality environment. The head mounted display 510 may be configured to display information associated with the computer-executable instructions generated by the user's actions (e.g., triggering and head motion) on the HUD. The instructions may relate the instructed movement of the user, enabling feedback for the user to see how their head movement was translated into a movement vector in the extended reality environment, and/or about any other user interaction with the extended reality environment.

In some embodiments of the present disclosure, the head mounted device 510 may be configured to utilize one or more visual effects that can reduce the likelihood of the user experiencing motion sickness when interacting with he extended reality environment. In one example, when interacting with an extended reality environment, the head mounted device 510 may utilize effects such as (but not limited to) motion blur or vignette. In some embodiments, the magnitude or intensity of the applied effect may depend on the magnitude and/or acceleration level of the user's movement within the extended reality environment. These visual effects may help to eliminate the potential for a user to experience motion sickness and may allow the user to immerse themself in the extended reality environment for longer periods of time than they would have been able to using conventional means for interacting with the extended reality environment.

In some embodiments consistent with the present disclosure, the head mounted device 510 may display the extended reality environment to the user in real-time. The display may be based on inputs received from the user. Being able to display the extended reality environment in real-time may allow for the user to make determinations and adjustments to their movement within the extended reality environment more easily. Real-time feedback from the user inputs without any unnecessary delay can assist in limiting the user's likeliness to experience motion sickness. When real-time feedback is coupled with analytics displayed on the extended reality headset, the analytics may provide the user with information related to their movement beyond what would be normally discernable in reality. As non-limiting examples, the feedback displayed on the HUD may include one or more of pitch angle, velocity, and other statistics relating to the movement of the user. The feedback may be immediately available to the user, enabling the user to move throughout the extended reality environment more accurately when compared to conventional movement systems.

C. Sensor Module

In some embodiments consistent with the present disclosure, the platform 100 may include a sensor module 530. The sensor module 530 may be used to operate (e.g., provide input to) the computing device 900. In some embodiments, the computing device 900 may use data from the sensor module 530 to determine the movement of the user in the physical environment. In some embodiments, the sensor module 530 may be tailored to determine head movements of the user. In other embodiments, the sensor module 530 may detect broader user movement, such as whole-body movement, limb movement, user interaction with physical objects, and/or the like. The sensor module 530 may be embedded in or be a part of the same device used for the head mounted display 510. For example, the sensor module 530 and the head mounted display 510 may be included in a headset device. By integrating the sensor module 530 and the head mounted display 510, the sensor module may be capable of sensing movement properties such as (but not limited to) acceleration, tilt, rotation, and velocity using sensors directly coupled to the user's head, thereby determining head movement without the need for any additional apparatus. In some embodiments consistent with the present disclosure, the sensor module 530 may exist within the system comprising the computing device 900 connected to the controller apparatus 520, and the head mounted display 510.

Examples of VR headsets that may be used in conjunction with and/or as a part of the platform 100 include, but are not limited to: HP Reverb, Oculus Rift, Oculus Quest, HTC VIVE, Google Cardboard, or PlayStation VR. In some embodiments, the platform 100 may leverage sensors already available in the VR headset as the sensor module 530. The sensor module 530 can be used to determine where the user is looking or other attributes required for provisioning and display of an extended reality environment. Use of existing sensors such as the sensor module 530 could enable the system to be more compact, cost-effective, and may even eliminate any need for additional specialized equipment to perform the method of the present disclosure.

In some embodiments, one or more (e.g., each) of the sensors that make up the sensor module 530 may be located or embedded within in the head mounted display module 510. Locating the sensors in the head mounted display module 510 may lead to increased accuracy in capturing data about the movement of the head using the sensors. Additionally, the sensor module 530 can be adapted to conform to the user's head or neck to capture the necessary data related to the movement of the user.

In some embodiments consistent with the present disclosure, the sensor module may utilize a single sensor to gather measurements for the system to complete the method of the present disclosure. For example, a sensor such as an inertial measurement unit (IMU) may be used. Using only one sensor can enable further miniaturization of the device, and can simplify data gathering techniques. Limiting the number of sensors used in the device can also make the device lighter, enabling the user to interact with the platform 100 for longer periods of time without fatigue or other physical stressors.

In some embodiments consistent with the present disclosure, collecting data needed to execute the method of the present disclosure may utilize an array of multiple sensors. A plurality of sensors may help to enable a plurality of different reference locations to be measured for a user, allowing for the system to collect a more complete and more accurate picture of the user's movement. The increased quantity of data concerning the user's movement may result in a higher quality replication of the movement being executed by the platform 100.

D. Processing Module

In some embodiments consistent with the present disclosure, the platform 100 may include a processing module 540 coupled to (e.g., in data communication with) each of the aforementioned modules, as well as other modules or devices (e.g., computing device 900). The processing module 540 may include, for example, a processing unit, memory storage, and/or any other hardware useful for processing data gathered or produced by any of the head mounted display 510, the controller module 520, or the sensor module 530. In some embodiments, the processing module 540 and the computing device 900 may be the same device.

The processing module 540 may operate locally (e.g., at the same location as the head mounted display 510, the controller module 520, or the sensor module 530) or operate remotely (e.g., at a different location, in the cloud, etc.). The processing module 540 may perform any methods disclosed herein. For example, the processing module 540 may perform the processing on-site (e.g., locally) without the need for a network connection. Additionally or alternatively, data may be transmitted from one or more of the head mounted display 510, the controller module 520, and/or the sensor module 530 to a remote processing device 540 for processing using a network connection. In some embodiments, the processing module 540 being remotely located may allow for use of a more advanced computing device to serve as the processing module, allowing the computationally intensive aspects of the present disclosure to be performed at a centralized processing module that may have a higher processing ability than a processor available locally.

In some embodiments consistent with the present disclosure the processing module 540 can be configured to operate within a local headset along with each of the aforementioned modules, as well as other modules such as computing device 900. For example, the processing module 540 may be incorporated into the construction of a headset to provide the user with a device incorporated with all necessary modules to accomplish the method of the present disclosure. This can enable a user to have a wholly incorporated extended reality movement platform 100 and remove the need for any additional devices.

In some embodiments the processing module 540 may be configured to remotely operate a vehicle, such as a UAV. The processing module 540 may utilize the method of the present disclosure to generate an extended reality environment correlating to the environment of the vehicle. The movement of the user as determined by the method of the present disclosure can be utilized to control the movement of the vehicle. This enables a new way to control vehicles, such as a UAV, that corresponds to the user's vestibular system and minimizes the chance of the user experiencing nausea or motion sickness.

In some embodiments the processing module 540 may be configured to operate remotely from the other modules of the system, such as in a cloud gaming environment. The processing module 540 may utilize the method of the present disclosure wherein the processing module 540 is located remotely relative to the headset, on a centralized server. Data may be streamed to the user over a network between the processing module and the headset (e.g., the head mounted display 510, the controller module 520, and/or the sensor module 530). The network connected processing module 540 enables the method of the present disclosure to be utilized on devices that would otherwise be computationally incapable of performing the method.

III. PLATFORM OPERATION

Embodiments of the present disclosure provide a hardware and software platform 100 operative by a set of methods and computer-readable media comprising instructions which, when executed, operate the aforementioned modules and computing elements in accordance with the methods. The following depicts an example of at least one method out of a plurality of methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements in operative communication with the computing device. For example, at least one computing device 900 may be employed in the performance of some or all of the stages disclosed with regard to the methods. Similarly, an apparatus may be employed in the performance of some or all of the stages of the methods. As such, the apparatus may comprise at least those architectural components as found in computing device 900.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the implementation used without altering or deterring from the fundamental scope of the depicted methods and systems disclosed herein.

A. Method of Moving an Avatar Through an Extended Reality Environment

Consistent with embodiments of the present disclosure, a method for moving an avatar through an extended reality environment may be performed by at least one of the aforementioned modules. The method may be embodied as, for example, but not limited to, computer instructions, which when executed, perform the method. The method may comprise the following stages:

1. 600 Receiving a first trigger event to set a first reference position for the head mounted device;
2. 602 Collecting raw sensor data from sensors associated with the head mounted device;

a. Wherein collecting raw sensor data from the head mounted device comprises measuring a position of the head mounted device along a plurality of axes.
3. 604 Processing the raw sensor data from the head mounted device;
   a. Wherein processing the raw sensor data from the head mounted device comprises determining a reference orientation of the head mounted device, relative to a vertical axis.
4. 606 Comparing a subsequent head position to the first reference position;
   a. Wherein comparing the subsequent head position comprises: collecting subsequent sensor data, processing the subsequent sensor data to determine a subsequent head position along the plurality of axes, determining a subsequent orientation of the head mounted device relative to the vertical axis, and comparing the subsequent orientation to the reference orientation.
5. 608 Determining translational movement of the user avatar in the extended reality domain based on the comparison of the subsequent head position to the first reference position;
   a. Wherein the translational movement of the user avatar corresponds to the expected movement of the user's vestibular system.
6. 610 Displaying the determined translational movement on the head mounted device;
   a. Wherein displaying the translational movement comprises displaying the movement throughout the extended reality environment as well as an indication of the movement taking place.
7. 612 Receiving a second trigger event to maintain the translational movement of the user and set a second reference position for the head mounted device;
   a. Wherein setting the second reference position comprises: collecting raw sensor data from the head mounted device, measuring a position of the head mounted device along a plurality of axes, and processing the raw sensor data from the head mounted device to determine a second reference orientation of the head mounted device, relative to a vertical axis.
8. 614 Comparing a second subsequent head position to the second reference position;
   a. Wherein comparing the second subsequent head position to the second reference position comprises: collecting second subsequent sensor data, processing the second subsequent sensor data to determine a second subsequent head position along the plurality of axes, determining a second subsequent orientation of the head mounted device relative to the vertical axis, and comparing the second subsequent orientation to the second reference orientation.
9. 616 Determining an elevation change of the user avatar based on the comparison of the second subsequent head position (e.g., the device's pitch) to the second reference position;
   a. Wherein the elevation change of the user avatar corresponds to the expected movement of the user's vestibular system.
10. 618 Combining the translational movement and the elevation change into a single movement vector;
11. 620 Displaying the movement vector on the head mounted device;
    a. Wherein displaying the movement vector comprises displaying the user avatar movement throughout the extended reality environment, as well as displaying an indication of the movement vector taking place.

Figure 6:
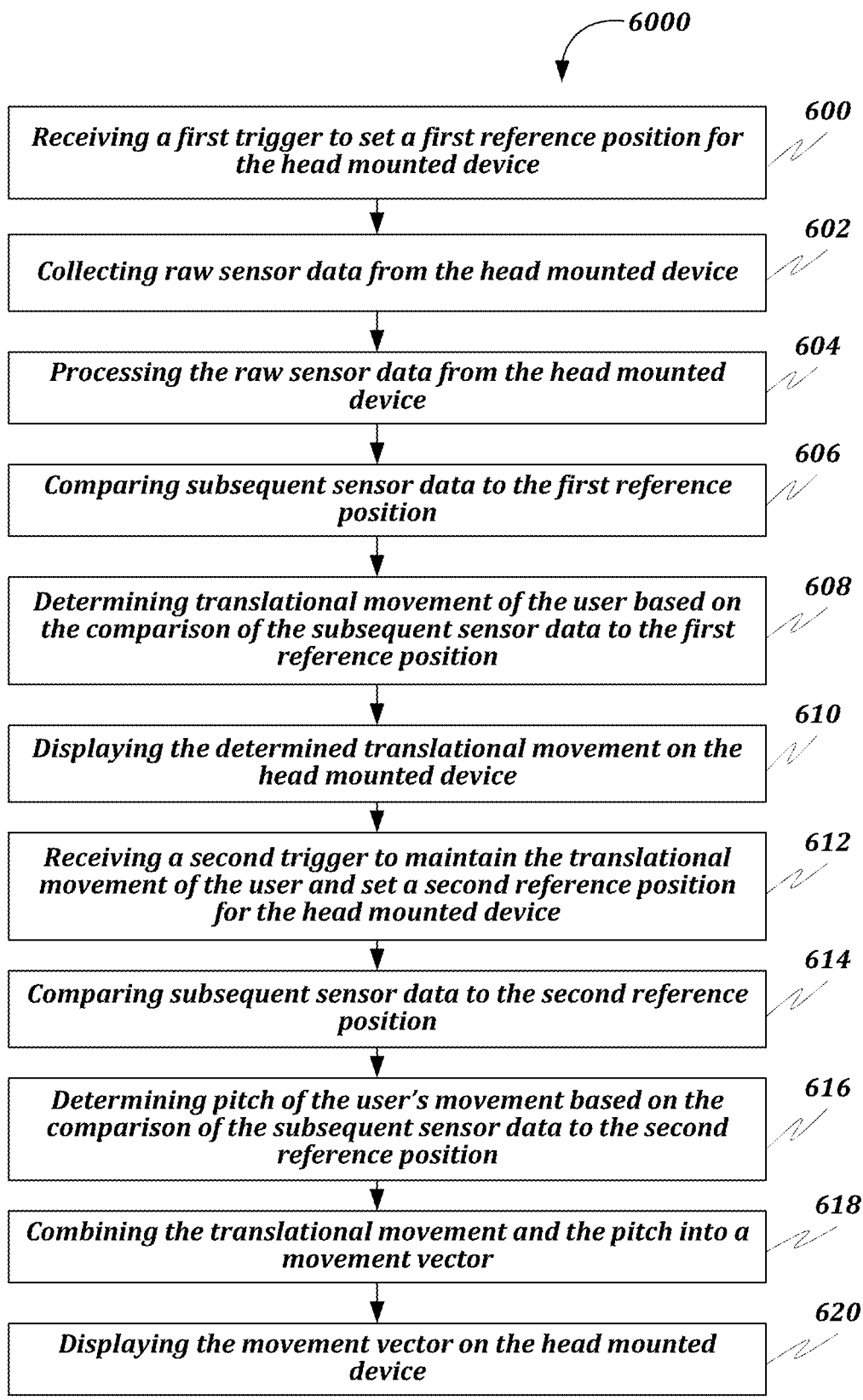
FIG. 6 is a flow chart of a method for providing avatar movement in an extended reality environment.
Figure 7:
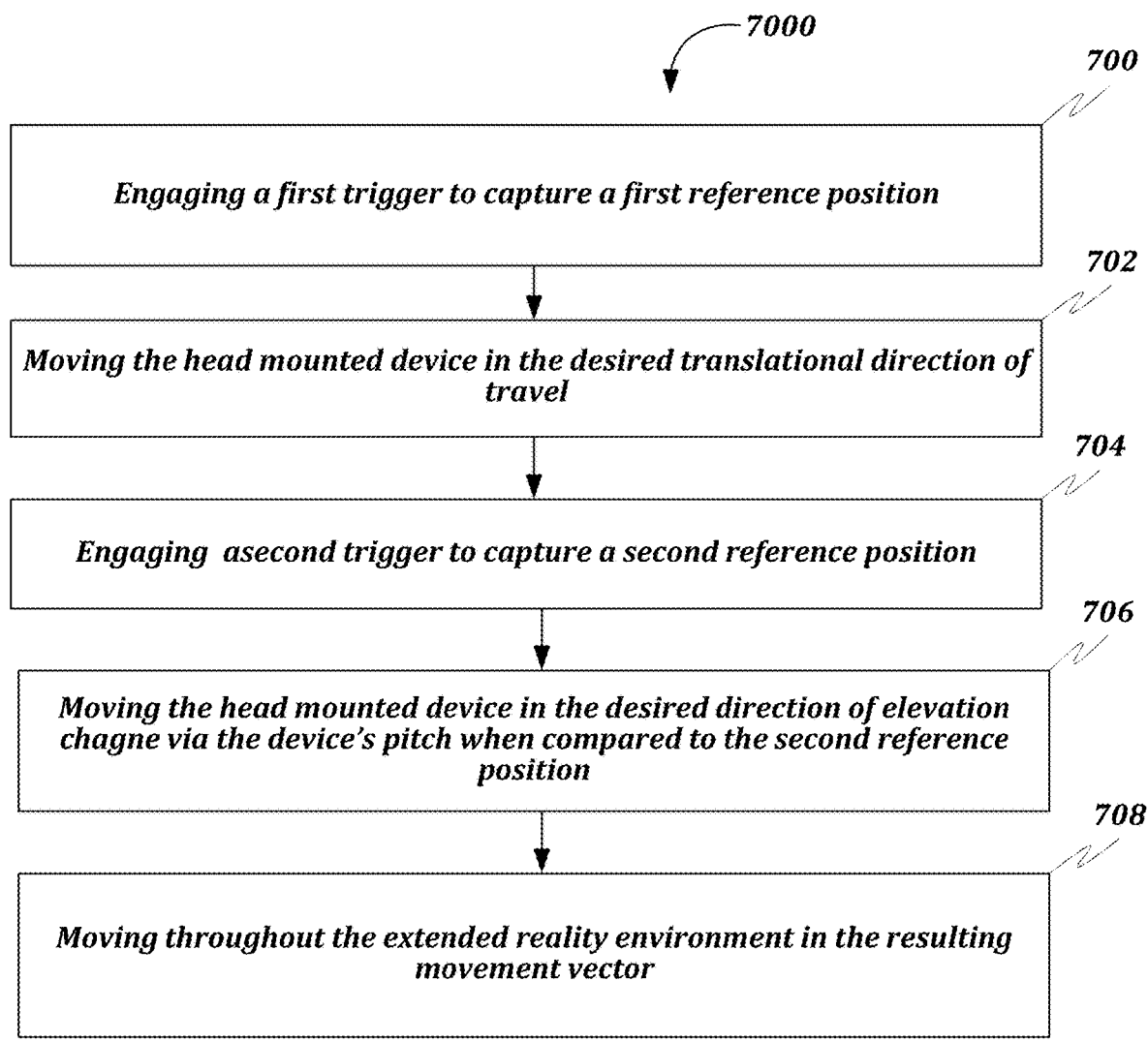
FIG. 7 is a flow chart of another method for providing avatar movement in an extended reality environment.
Figure 8:
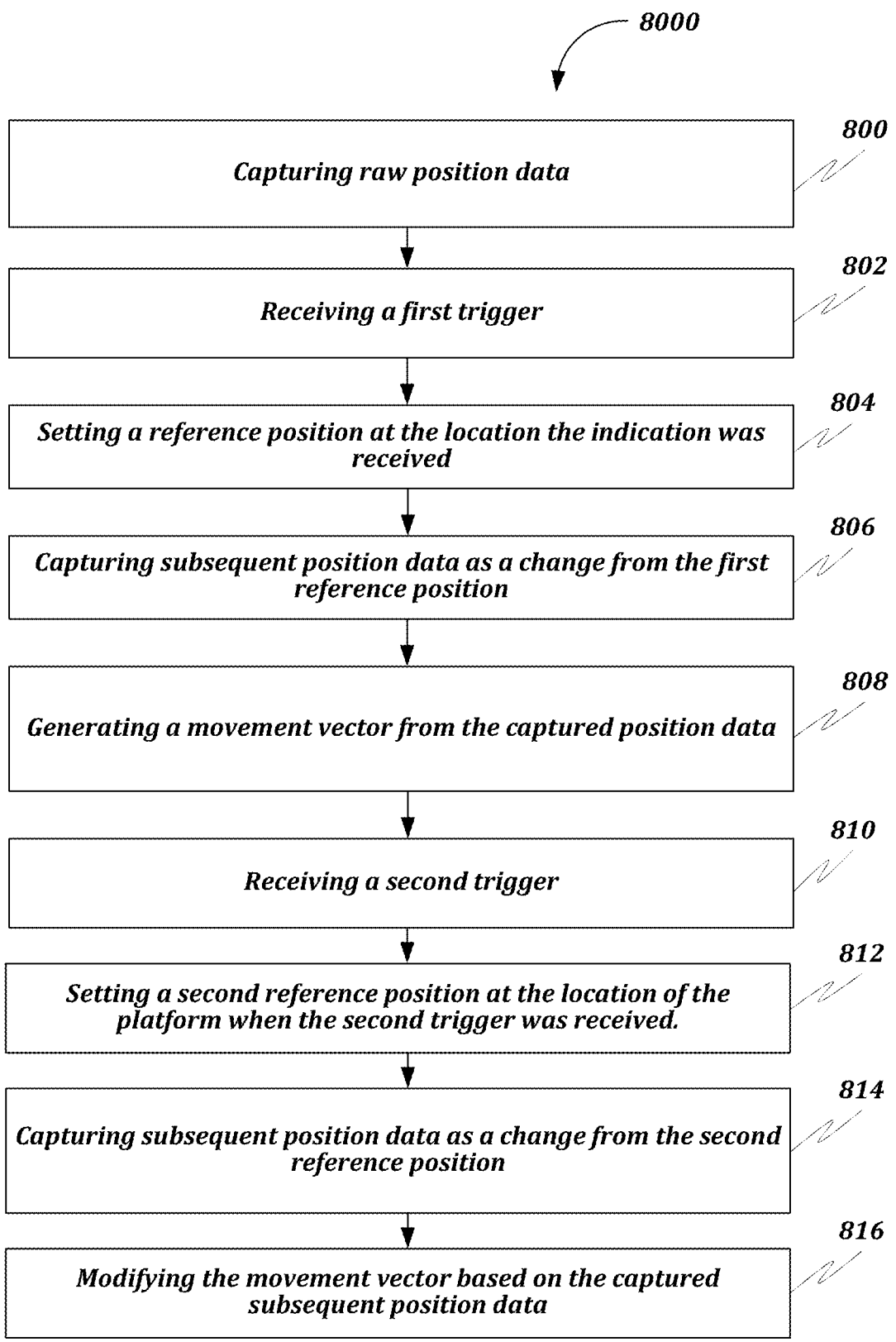
FIG. 8 is a flow chart of another method for providing avatar movement in an extended reality environment.

FIG. 6 is a flow chart setting forth the general stages involved in a method 6000 for moving a user avatar in an extended reality environment (e.g., a mixed reality environment, an augmented reality environment, an extended reality environment, and/or the like) consistent with an embodiment of the disclosure. Method 6000 may be implemented using a computing device 900 or any other component(s) associated with platform 100 as described in more detail below with respect to FIG. 9. For illustrative purposes alone, computing device 900 is described as one potential actor in the follow stages.

Method 6000 may begin at starting block 6000 and proceed to stage 600, where computing device 900 receives a first trigger event to set a first reference position for the head mounted device and captures. As one example, the first trigger event may come from the controller module. As specific examples, the first trigger event may be (but is not limited to) actuation of a particular button or trigger, receipt of a particular brainwave signal via a brainwave reader or EEG, or any other signal from the user indicating an intent to set an initial head position.

Figure 1B:
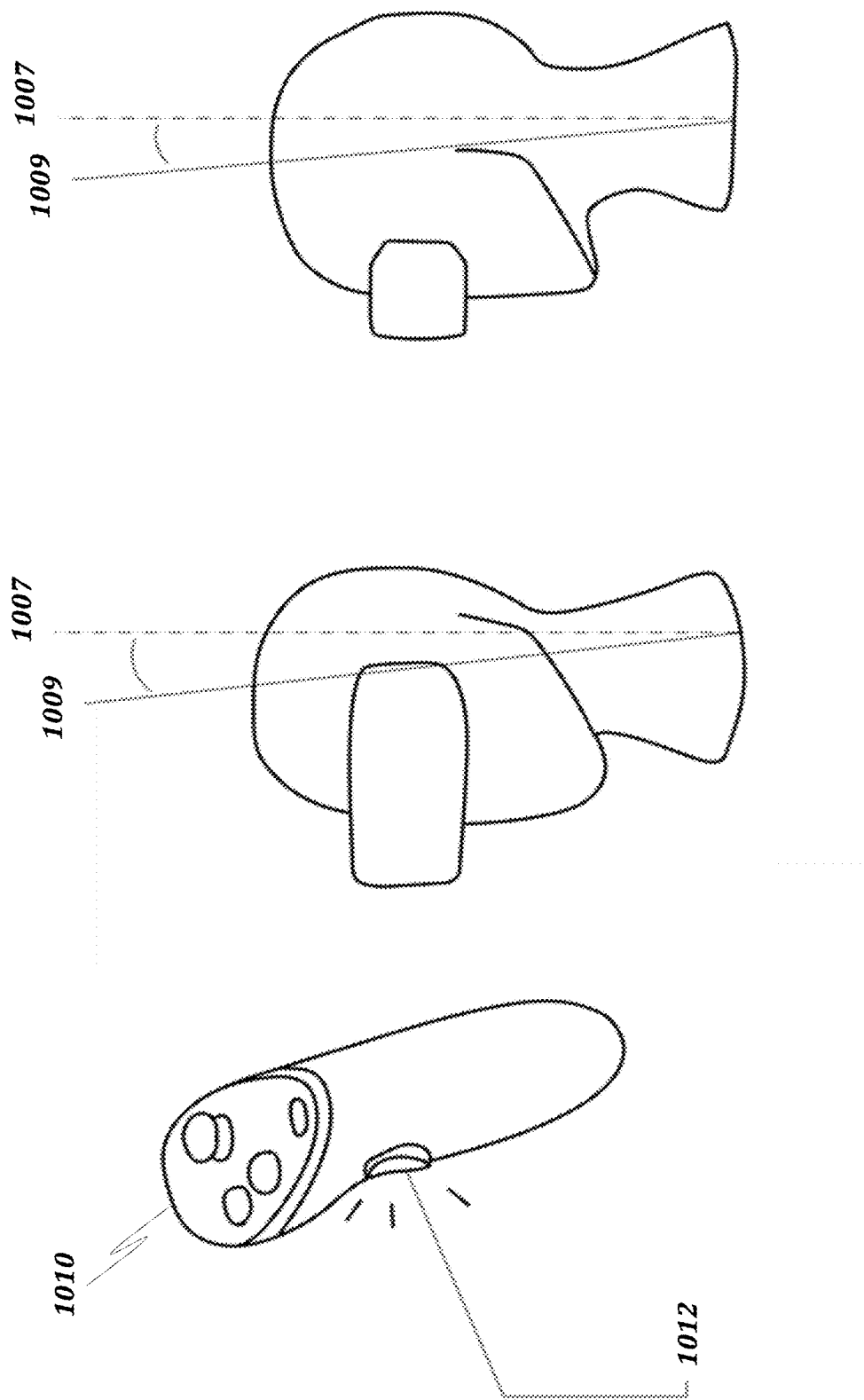
FIG. 1B illustrates a handheld device with a trigger mechanism, wherein engagement of the trigger mechanism captures a reference axis of the head mounted device at the time the trigger mechanism is engaged in accordance with embodiments of the present disclosure.

FIG. 1B illustrates a handheld device 1010 in communication with the head mounted device 1005. The handled device 1010 may comprise at least one trigger mechanism 1012. As shown in FIG. 1B, the trigger mechanism 1012 is a physical button or trigger. However, the trigger mechanism may be a button, switch, toggle, brainwave reader, EEG, or any other mechanism by which a user may express intent to trigger the head position measurement. The handheld device 1010 may be in communication with the head mounted device 1005.

Method 6000 may then proceed to stage 602 where, responsive to receiving the first triggering event, the computing device may collect sensor data indicating the position of the head mounted device. In some embodiments, the system may store the position and/or orientation of the head mounted device at substantially the time the first trigger event is received.

FIGS. 1A and 1B illustrate one way in which position can be measured upon receiving a trigger event in accordance with an embodiment of the present disclosure. As shown in FIG. 1A, a head mounted device 1005 may be oriented along a vertical axis 1007 (e.g., orthogonal to the ground plane). The head mounted device 1005 may use one or more sensors to measure a position of the head mounted device with respect to the vertical axis 1007. The head mounted device 1005 may comprise one or more sensors configured to measure at least one of: a position of the head mounted device relative to the vertical axis 1007 or movement of the head mounted device 1005. In some embodiments, the head mounted device 1005 may also comprise a display configured for virtual reality, augmented reality, mixed reality, or other digital display.

As illustrated in FIG. 1B, when worn by a user, the head mounted device 1005 may not be oriented strictly along the vertical axis 1007. For example, the user may, out of habit or for comfort, naturally maintain an angle with their head. In such a situation, the head mounted device 1005 may define a reference axis 1009, which is not parallel to the vertical axis 1007.

Responsive to receiving the first trigger event, a computing device may collect data from the one or more sensors related to the position of the head mounted device, which correlates directly to the position of the user's head. In some embodiments of the present disclosure, responsive to the trigger mechanism 1012 being engaged or actuated, the system may capture or collect positional data from one or more sensors of the head mounted device. In embodiments, the positional data may be data specifying a position of the head mounted device relative to a vertical axis. For example, the positional data may indicate the reference axis 1009 associated with the location or position of the head mounted device 1005 when the trigger mechanism 1012 is engaged. Accordingly, the captured reference axis 1009 may be different from the vertical axis 1007.

From stage 602, where computing device 900 collects sensor data from the head mounted device, method 6000 may advance to stage 604 where computing device 900 may process the sensor data. For example, processing the sensor data from the head mounted device may comprise determining the orientation of the head mounted device, relative to an axis (e.g., the vertical axis). That is, as shown in FIG. 1B, processing the data may comprise determining the angle between the reference axis 1009 and the vertical axis 1007. In some embodiments, processing the data may further comprise determining translational movement along the ground plane relative to the axis position.

Once computing device 900 processes the raw sensor data from the head mounted device in stage 604, method 6000 may continue to stage 606 where computing device 900 may compare subsequent sensor data to the first reference position. Comparing the subsequent sensor data may comprise, for example, collecting subsequent sensor data, processing the subsequent sensor data to determine a subsequent head position along the plurality of axes, determining a subsequent orientation of the head mounted device relative to the vertical axis, and/or comparing the subsequent orientation to the reference orientation.

Comparing the subsequent sensor data may start with collecting subsequent sensor data. As in stage 602, collecting subsequent sensor data may comprise reading, collecting, or otherwise determining sensor data at a point in time subsequent to the time at which the first trigger event was received. In some embodiments, the subsequent point in time may be a period of time (e.g., 1 second, 0.5 seconds, 0.1 seconds, etc.) after the first trigger event is received. In other embodiments, the subsequent point in time may be determined based on a subsequent triggering event. For example, where the first triggering event is actuation of a physical button or trigger, the subsequent triggering event may be release of the button or trigger. In some embodiments, the platform 100 may monitor the sensor data substantially continuously for changes.

At the subsequent point in time, the computing device may retrieve the sensor data indicating the subsequent position of the head mounted device. In some embodiments, the system may store the subsequent position and/or orientation of the head mounted device. For example, between the time of the first triggering event and the subsequent time, the user may rotate their head forward, backward to the left, or to the right (e.g., about the x-axis and/or the z-axis). In such a situation, the head mounted device 1005 may define a subsequent axis, which is not parallel to the reference axis 1009.

The system may process the subsequent sensor data to determine a subsequent head position along the plurality of axes. For example, processing the sensor data from the head mounted device may comprise determining the orientation of the head mounted device, relative to an axis (e.g., the vertical axis). That is, as shown in FIG. 1B, processing the data may comprise determining the angle between the subsequent axis and the vertical axis 1007. In some embodiments, processing the data may further comprise determining translational movement along the ground plane relative to the axis position.

The system may compare the subsequent orientation to the reference orientation. In embodiments, comparing the subsequent orientation to the reference orientation may comprise determining a difference between 1) the angle defined by the reference axis and the vertical axis, and 2) the angle defined by the subsequent axis and the vertical axis. In embodiments, the difference may be expressed as a difference in angle measured about the x-axis and/and or a difference in angle measured about the z-axis.

After computing device 900 compares subsequent sensor data to the first reference position in stage 606, method 6000 may proceed to stage 608 where computing device 900 may determine translational movement of a user avatar in the extended reality environment based on the comparison of the subsequent sensor data to the first reference position. For example, the translational movement of the user will correspond to the expected movement of the user's vestibular system.

Figure 2A:
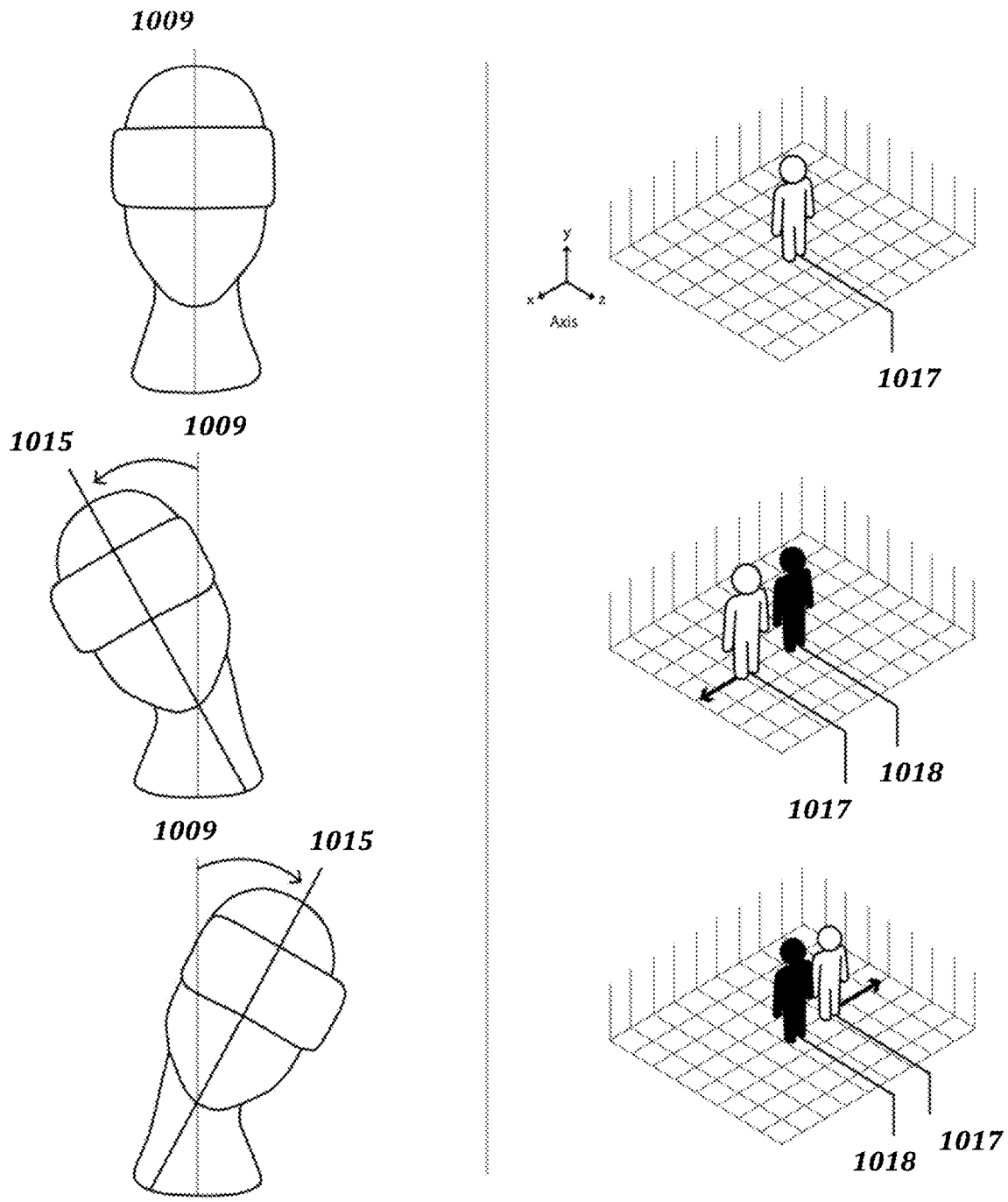
FIG. 2A illustrates an embodiment of side-to-side movement in an extended reality environment by moving the head mounted device after capturing the reference axis in accordance with embodiments of the present disclosure.
Figure 2B:
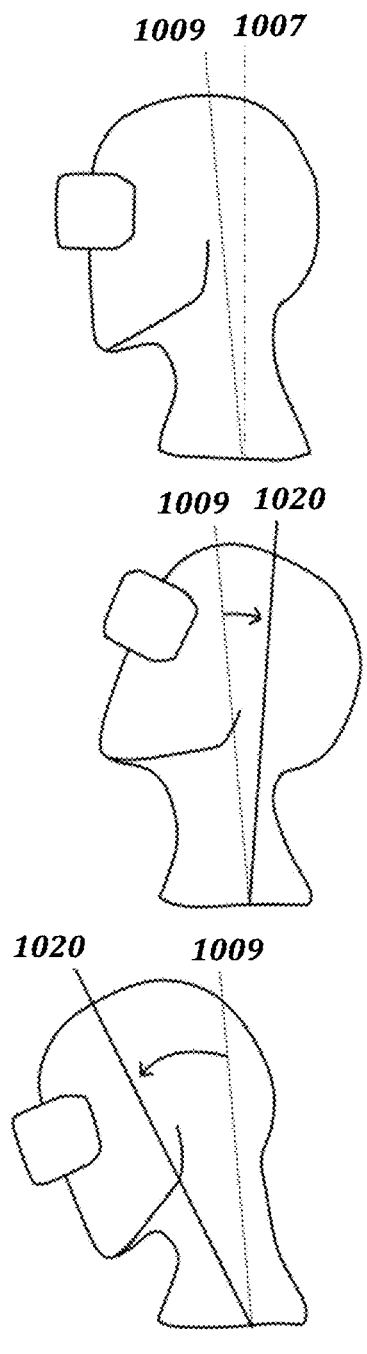
FIG. 2B illustrates an embodiment of forward and backwards movement in the extended reality environment by moving the head mounted device after capturing the reference axis in accordance with embodiments of the present disclosure.
Figure 2B:
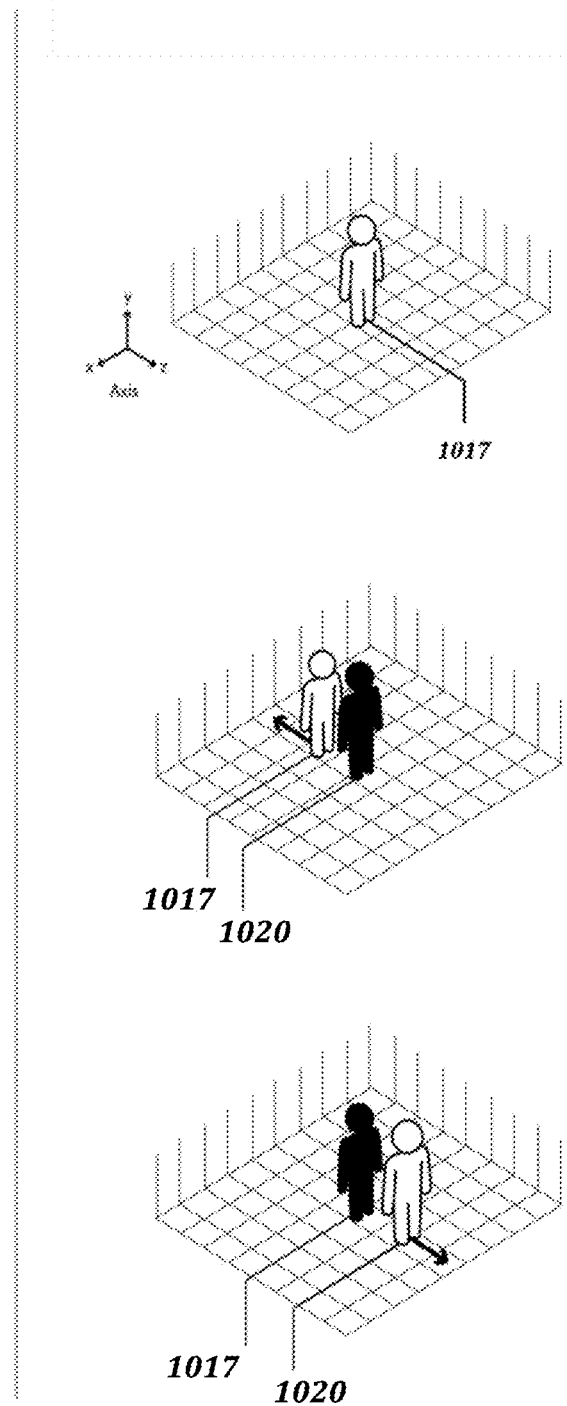

FIGS. 2A-2B illustrate one way that the sensor data collected from the movement of the user's head correlates to translational movement in the extended reality environment. In some embodiments, movement through an extended reality environment 1025 may comprise moving along one or more axis (e.g., the x-axis and/or the z-axis) in the extended reality environment 1025. Upon receipt of the first trigger event, the platform 100 may associate the reference axis 1009 with a current position 1018 in the extended reality environment. As the position or orientation of the head mounted device changes after the engagement of the trigger mechanism (e.g., to the subsequent position), the current position of the head mounted device 1015 is measured from the captured reference axis 1009. The movement platform 100 may then correlate the current position of the head mounted device 1015 to a movement within the extended reality environment 1025 such that the avatar moves from current position 1018 to a new position 1017. In embodiments, one or more properties of the movement in the extended reality environment 1025 may be proportional to the difference between the captured reference axis 1009 and the current position 1015 of the head mounted device. As non-limiting example, the rate, acceleration, and/or distance of the movement may be proportional to the magnitude of the difference between the captured reference axis 1009 and the current position 1015 of the head mounted device. As particular examples, FIG. 2A shows movement of a user avatar along the x-axis in an extended reality environment 1025, based on rotation of the user's head about the z-axis in physical space; FIG. 2B shows movement of a user avatar along the z-axis in an extended reality environment 1025, based on rotation of the user's head about the x-axis in physical space. In embodiments, the examples can be combined, such that the avatar moves along both the x-axis and the z-axis in the extended reality environment 1025, based on rotation of the user's head about both the z-axis and the x-axis in physical space.

In some embodiments of the present disclosure the rate of movement in the extended reality environment 1025 may increase proportionally as the current position 1015 and the captured reference position 1009 of the head mounted device 1010 increase. In some embodiments, the speed of movement throughout the extended reality environment 1025 may correspond to the speed of the movement of the head mounted device. Further, the degree of head movement detected from the head mounted device may correspond to one or more of: speed of movement in the extended reality environment 125 and/or distance of movement in the extended reality environment.

In some embodiments of the present disclosure, the movement in the extended reality environment 1025 may be associated with a vestibular system of the user. That is, when the user tilts their head in a particular direction, the body may be conditioned to "expect" movement in that direction. Accordingly, determining the movement in the extended reality environment 1025 based on the change in head angle may help movement match with the "expected" movement of the vestibular system, thereby decreasing nausea or motion sickness experienced by the user when navigating the extended reality environment 1025.

After computing device 900 determines the translational movement of the head mounted device in stage 608, method 6000 may proceed to stage 610 where computing device 900 may display the determined translational movement on the head mounted device. In embodiments, displaying the determined translational movement may include the platform 100 displaying the user's movement throughout the extended reality environment. In some embodiments, displaying the determined translational movement may include displaying one or more characteristics associated with the movement. For example, the platform may display a movement angle, a rate of movement, a distance from the original position moved, an acceleration, or any other characteristic associated with the movement taking place. In embodiments, the characteristics may be updated substantially in real time, such that a user may access the information to make decisions regarding further movement in the extended reality environment.

Figure 3:
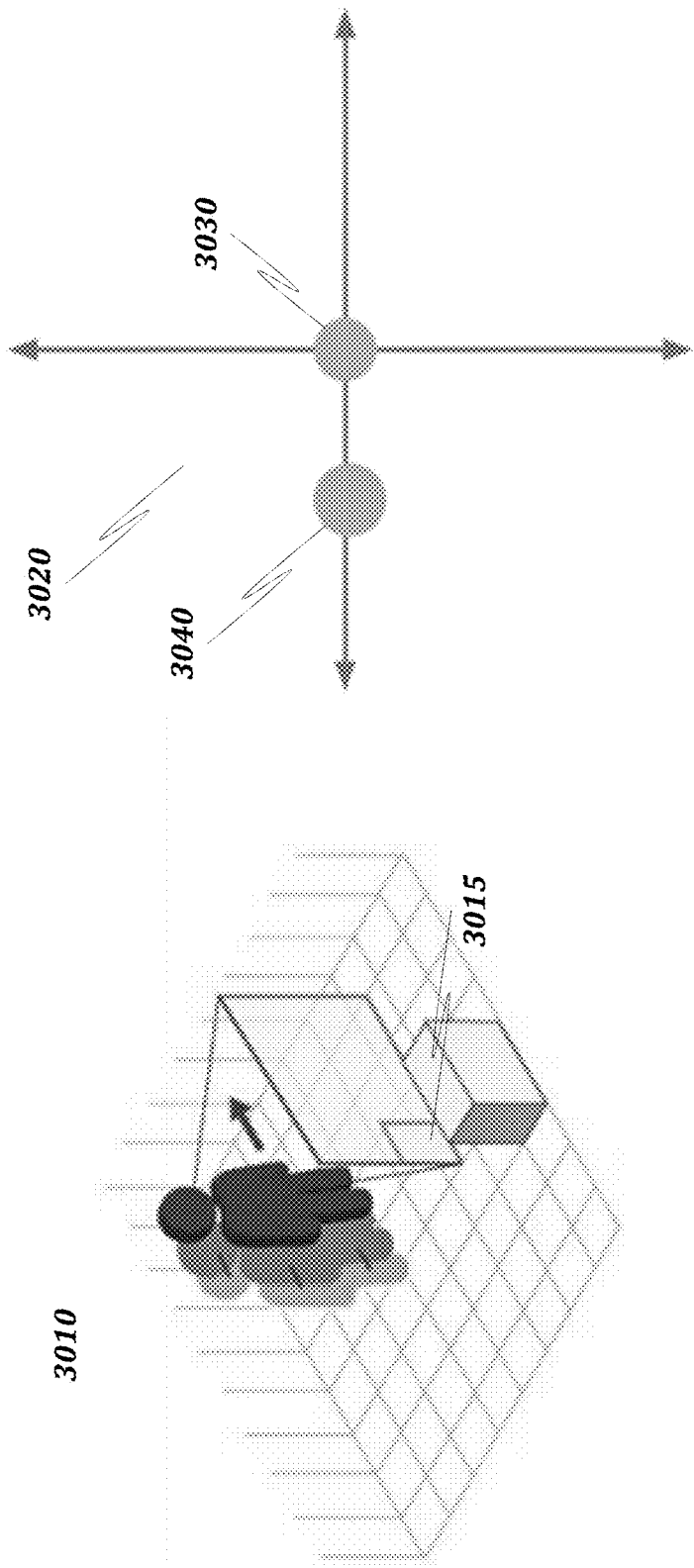
FIG. 3 illustrates an embodiment of an indicator that can be displayed to the user corresponding to their movement in the extended reality environment in accordance with the present disclosure.

FIG. 3 illustrates one possible indicator that can be displayed on the head mounted device the user with information about characteristics relating to the current movement vector within the extended reality environment. As shown in FIG. 3, a user in an extended reality environment 3010 may see, in a HUD 3015 within the field of view of the user, an indicator 3020. The indicator 3020 may be calibrated to display a movement vector of the user on a map-like projection of the mixed-reality environment 3010. an indication of the captured reference axis. For example, as shown in FIG. 3, the movement vector may have an origin point at 3030 and a terminus point at 3040. Some embodiments may utilize an additional indicator to display the movement of the user relative to the captured reference position. Accordingly, the indicator may display information relating to the user's movement in the extended reality environment.

Optionally, after computing device 900 displays the determined translational movement of the head mounted device in stage 610, method 6000 may proceed to stage 612 where computing device 900 may receive a second trigger event to maintain the translational movement of the user and set a second reference position for the head mounted device. For example, the second trigger event may be generated based on a user interaction with the controller module. As discussed above with respect to stage 600, the trigger event may be any event which indicates user intent to establish a second reference position.

In embodiments, setting the second reference position may include collecting sensor data from the head mounted device. In response to receiving the second trigger event, a computing device may collect data from the one or more sensors related to the position of the head mounted device, which correlates directly to the position of the user's head. In some embodiments of the present disclosure, in response to the second trigger event, the system may capture or collect positional data from one or more sensors of the head mounted device. In embodiments, the positional data may be data specifying a position of the head mounted device relative to a vertical axis. For example, the positional data may indicate a second reference axis associated with the location or position of the head mounted device. Accordingly, the captured second reference axis may be different from the vertical axis.

The system may process the raw sensor data from the head mounted device to determine a second reference orientation of the head mounted device, relative to a vertical axis. Processing the sensor data from the head mounted device may comprise determining the orientation of the head mounted device, relative to an axis (e.g., the vertical axis). That is, processing the data may comprise determining the angle between the second reference axis and the vertical axis.

In embodiments, the system may store the orientation of the head mounted display at the time that the second trigger event is received as a second reference orientation.

After computing device 900 receives a second trigger to maintain the translational movement of the user in stage 612, method 6000 may proceed to stage 614 where computing device 900 may compare second subsequent sensor data to the second reference position. Comparing the second subsequent sensor data to the second reference position comprises: collecting second subsequent sensor data, processing the second subsequent sensor data to determine a second subsequent head position along the plurality of axes, determining a second subsequent orientation of the head mounted device relative to the vertical axis, and comparing the second subsequent orientation to the second reference orientation. For example, the platform 100 will continue to collect raw sensor data and compare it to the second reference position.

The system may collect second subsequent sensor data. In embodiments, collecting second subsequent sensor data may include, for example, determining a second subsequent point in time after the second trigger is received. The second point in time may be a fixed duration following the second trigger event set by either the user or the system, or may be based on a second subsequent trigger event. At the second subsequent point in time, the system may capture second subsequent sensor data. The second subsequent sensor data may define a second subsequent axis that is not parallel to the second reference axis.

The system may process the second subsequent sensor data. In embodiments, processing the second subsequent sensor data may allow the system to determine a second subsequent head position along the plurality of axes. For example, processing may include determining an angle between the second subsequent axis and the vertical axis.

The system may compare the second subsequent orientation to the second reference orientation. In embodiments, comparing the second subsequent orientation to the second reference orientation may include determining an angle between the second subsequent axis and the second reference axis.

After computing device 900 compares subsequent sensor data to the second reference position in stage 614, method 6000 may proceed to stage 616 where computing device 900 may determine an elevation change of a user avatar in the extended reality environment based on the comparison of the subsequent sensor data to the second reference position. The movement platform 100 may correlate the angle between the second subsequent axis and the second reference axis to an elevation change within the extended reality environment 1025 such that the avatar moves from first elevation to a second elevation. In embodiments, one or more properties of the elevation change in the extended reality environment 1025 may be proportional to the angle between the second subsequent axis and the second reference axis. As a non-limiting example, the rate, acceleration, and/or distance of the elevation change may be proportional to the magnitude of angle between the second subsequent axis and the second reference axis.

The elevation change can be based on the subsequent sensor data of the user to correspond with the expected movement of the user's vestibular system. That is, when the user tilts their head in a particular direction, the body may be conditioned to "expect" movement in that direction. Accordingly, determining the elevation change in the extended reality environment based on the change in head angle may help movement match with the "expected" movement of the vestibular system, thereby decreasing nausea or motion sickness experienced by the user when navigating the extended reality environment.

Figure 2C:
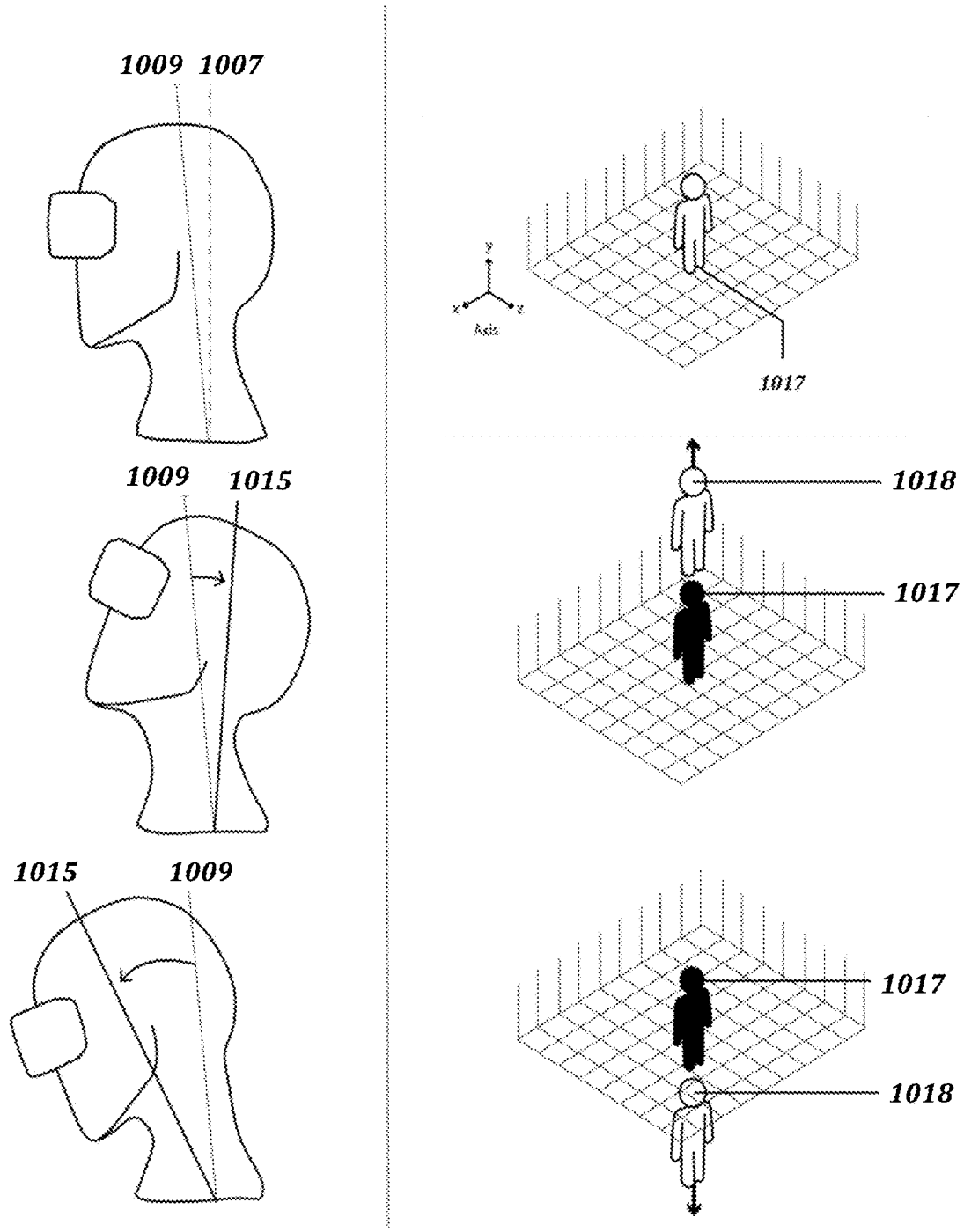
FIG. 2C illustrates an embodiment of changing the elevation of the user avatar in the accordance with embodiments of the present disclosure.

FIG. 2C illustrates one way that the sensor data collected from the movement of the user's head correlates to elevation change in the extended reality environment. In some embodiments, movement through an extended reality environment 1025 may comprise moving along one or more axis (e.g., the y-axis) in the extended reality environment 1025. Upon receipt of the second trigger event, the platform 100 may associate the reference axis 1009 with a current position 1018 in the extended reality environment. As the position or orientation of the head mounted device changes after the engagement of the trigger mechanism (e.g., to the subsequent position), the current position of the head mounted device 1015 is measured from the captured reference axis 1009. The movement platform 100 may then correlate the current position of the head mounted device 1015 to an elevation change within the extended reality environment 1025 such that the avatar moves from current position 1018 (having a first elevation) to a new position 1017 (having a second elevation). In embodiments, one or more properties of the movement in the extended reality environment 1025 may be proportional to the difference between the captured reference axis 1009 and the current position 1015 of the head mounted device. As non-limiting example, the rate, acceleration, and/or distance of the elevation change may be proportional to the magnitude of the difference between the captured reference axis 1009 and the current position 1015 of the head mounted device.

After computing device 900 determines the elevation change of a user's movement based on the comparison of the subsequent sensor data to the second reference position in stage 616, method 6000 may proceed to stage 618 where computing device 900 may combine the translational movement and the elevation change into a movement vector. For example, the platform 100 may add or otherwise combine the translational movement determined in stage 608 and the elevation change calculated in stage 616 to create a compound movement vector that includes both translational movement and elevation change.

After computing device 900 combines the translational movement and the elevation change into a movement vector in stage 618, method 6000 may proceed to stage 620 where computing device 900 may display the compound movement vector on the head mounted device. In embodiments, displaying the determined translational movement may include the platform 100 displaying the user's movement throughout the extended reality environment. In some embodiments, displaying the determined compound movement vector may include displaying one or more characteristics associated with the movement. For example, the platform may display a movement angle, a rate of movement, a distance from the original position moved, an acceleration, or any other characteristic associated with the movement taking place. In embodiments, the characteristics may be updated substantially in real time, such that a user may access the information to make decisions regarding further movement in the extended reality environment.

Once computing device 900 displays the movement vector on the head mounted device in stage 620, method 6000 may then end at stage 620, or may return to stage 600 to await a new trigger event.

Further, in some embodiments of the present disclosure, the platform may decelerate the movement of the user avatar through the extended reality environment after the disengagement of the trigger mechanism. The platform may decelerate the user at a pre-defined rate. In some embodiments, the rate of deceleration may be correlated to the movement speed and/or the rate of acceleration. For example, the system may analyze the user's acceleration in the extended reality environment upon engagement of the trigger and match the rate of deceleration to the analyzed acceleration. The deceleration of the user in the extended reality environment may be selected or determined based at least in part on an ability of the selected deceleration rate to prevent the user from experiencing nausea while navigating the extended reality environment.

Figure 4:
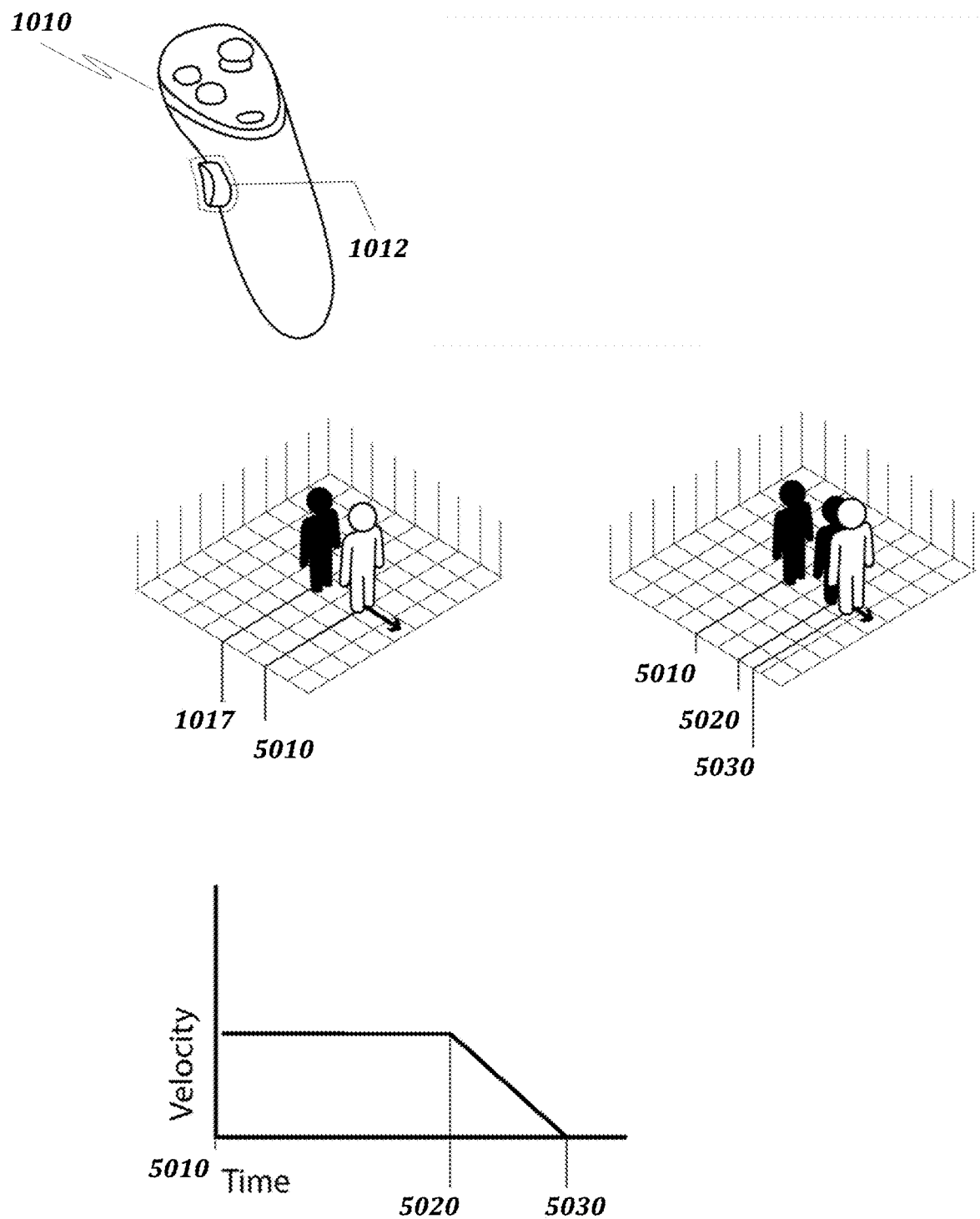
FIG. 4 illustrates an embodiment of the present disclosure where the user's movement in the extended reality environment decreases at a constant rate after they release the trigger in accordance with the present disclosure.

FIG. 4 illustrates one way to control avatar deceleration. The user's movement can be configured in a way that assists in the prevention of motion sickness caused by instantaneous changes in user velocity within an extended reality environment, in accordance with an embodiment of the present disclosure. Upon disengagement of the trigger mechanism, the platform may automatically control the deceleration of the user avatar through the extended reality environment. The platform may determine the rate of deceleration based at least in part on the acceleration upon activating the trigger and/or the speed at the point of disengagement. Alternatively, the platform may decelerate the user in the extended reality environment using a fixed deceleration when the trigger mechanism is disengaged. As shown in FIG. 5, a user may maintain a constant velocity during a time period from 5010 to 5020. The user may release or disengage a trigger mechanism at time 5020. Responsive to this disengagement, the platform may decrease the velocity of the user at a determined rate until the velocity reaches zero at time 5030. In embodiments, the deceleration may be set by the user to determine how the platform decelerates the user's movement in the extended reality environment. For example, deceleration may be constant, a step function, an exponential function, or any other discrete or linear means of returning the velocity value to zero within a bounded time. In some embodiments, the deceleration time (e.g., the time period between 5020 and 5030) may be set based on one or more movement characteristics, and the deceleration rate may be determined based on the time.

B. First Alternative Method of Moving an Avatar Through an Extended Reality Environment 1. 700 Engaging a first trigger to capture a first reference position;
    a. wherein the first trigger can be on the controller module.
2. 702 Moving the head mounted device in the desired translational direction of travel;

a. wherein the desired direction of travel is in relation to the reference position of the first trigger.
3. 704 Engaging a second trigger to capture a second reference position;
   a. wherein the second reference position can be on the controller module.
4. 706 Moving the head mounted device in the desired direction of elevation change via the device's pitch when compared to the second reference position;
   a. wherein the desired elevation change is in relation to the reference position of the second trigger.
5. 708 Moving throughout the extended reality environment in the resulting movement vector.

In another aspect a user may interact with an extended reality movement platform 100. The platform 100 can be configured to provide the user with conventional means of viewing an extended reality environment without interfering with the method of the present disclosure. Through the utilization of the users' movement captured by the head mounted device, the platform 100 can be configured to provide a user with a means of moving throughout the extended reality environment as described in the present disclosure.

When the user wishes to move throughout the extended reality environment a first trigger may be received at stage 700, thus initiating method 7000. The first trigger may be a physical switch or button, a brainwave reader or EEG, or any other triggering mechanism. With the first trigger engaged, the user may tilt or move their head in a direction that corresponds to the desired movement direction of the user avatar in stage 702. As the user tilts their head, they can control translational movement of a user avatar through the extended reality environment in a manner that corresponds to the user's vestibular system when compared to the position of the user's head when the initialization trigger is received. Responsive to the user engaging the first trigger, a reference point indicator may be displayed in the head mounted device to assist in quantifying the user's movement by displaying the change in position from the initialization reference point of the user's head. In some embodiments, acceleration corresponding to the translational movement of the user may be limited in such a way to both assist in the prevention of the user becoming motion sick and to reflect actual movement characteristics of the user more accurately. Accordingly, the head mounted device may determine a user's movement in an extended reality environment as the head mounted device changes position, which may correspond to a user changing the position of their head when they may be using the head mounted device.

A second trigger can be engaged at stage 704 to control the elevation change of the user's movement. The second trigger may be a physical switch or button, a brainwave reader or EEG, or any other triggering mechanism. In some embodiments, the translational movement vector and direction of the user are maintained when the second trigger is engaged. Additionally, responsive to the second trigger being engaged, a second reference position of the user is stored. From the second reference position a user can use the movement of their head (e.g., the pitch of the user's head) to control the elevation change of the user avatar movement in stage 706. As the user alters the device's pitch by moving their head, the elevation change of the user's movement is controlled based on the comparison of the second reference position and the current position of the user's head to align with what is expected from the user's vestibular system. In stage 708, the avatar movement correlating to the user's head movements may take place.

Upon release of the triggers, the movement of the user avatar may immediately cease. Alternatively, upon release of the triggers, the movement of the user avatar may be configured to decelerate at a rate that would more accurately represent the motion that is taking place.

In some embodiments, upon release of the first trigger, the user may determine whether the platform should end all movement in the extended reality environment, or end the translational movement, while maintaining any elevation change movement. In some embodiments, upon release of the second trigger, the user may determine whether the platform should end all movement in the extended reality environment, or end the elevation change movement, while maintaining any translational movement. In this way, the platform may be configured to allow for multi-trigger, multi-axis movement in an extended reality environment.

C. Second Alternative Method of Moving an Avatar Through an Extended Reality Environment 1. 800 Capturing raw position data.
2. 802 Receiving a first trigger.
3. 804 Setting a reference position at the location of the platform when the trigger was received.
4. 806 Capturing subsequent position data as a change from the first reference position.
5. 808 Generating a movement vector from the captured position data.
6. 810 Receiving a second trigger.
7. 812 Setting a second reference position at the location of the platform when the second trigger was received.
8. 814 Capturing subsequent position data as a change from the second reference position.
9. 816 Modifying the movement vector based on the captured subsequent position data.

In another aspect the platform may capture raw position data of a headset while a user interacts with an extended reality platform 100. The platform can be configured to provide the user a means of viewing an extended reality environment without interfering with the method of the present disclosure such as, but not limited to the head mounted device. As the user interacts with the platform 100, the platform may be configured to capture raw position data at stage 800. In some embodiments of the present disclosure, the raw position data may be associated with the position of the head mounted device. Through utilization of the head mounted device, the user may be able to at least partially interact with the extended reality environment, such as looking around the extended reality environment or other non-movement conventional interactions with the extended reality environment.

To begin movement in the extended reality environment, the platform may receive a first trigger event at stage 802. In embodiments, the first trigger event may be received in real time or substantially in real-time. In some embodiments the platform may receive the first trigger event from at least one of the following: a physical switch or button, brainwave reader or EEG, or other types of triggering mechanisms. In some embodiments of the present disclosure, the trigger mechanisms may be located on at least one of the following: the head mounted device, the handheld device, or other device in communication with the platform. In some embodiments of the present disclosure, the trigger mechanism may be a computer peripheral device or a gaming system peripheral device.

Upon receiving the first trigger, the platform may set a reference position at stage 804. In embodiments, the reference position may be set based at least in part on a location and/or orientation of the platform when the trigger was received, such as the position of the head mounted device. Responsive to the user engaging the first trigger, a reference point indicator may be displayed in the head mounted device to assist in quantifying the user's movement by displaying the change in position from the initialization reference point of the user's head. Additionally, acceleration corresponding to the translational movement of the user may be limited in such a way to both assist in the prevention of the user becoming motion sick and to reflect actual movement characteristics of the user more accurately. Accordingly, the head mounted device may determine a user's movement in an extended reality environment as the head mounted device changes position, which may correspond to a user changing the position of their head when using the head mounted device.

The platform may then capture subsequent position data in stage 806. The subsequent position data may be measured relative to the captured reference position, such that the platform measures the change in position of the platform. Further embodiments of the present disclosure may capture subsequent raw position data and utilize the platform to compare the captured subsequent raw position data to the captured reference position.

From the captured reference position data and/or the captured subsequent position data, the platform may generate a movement vector through the extended reality environment in stage 808. The movement may comprise translational movement throughout the environment. In some embodiments, the movement vector throughout the environment may correspond to a change between the captured reference position and the subsequent movement data. Additionally, the platform may generate a movement vector that corresponds to the vestibular system of the user. In some embodiments, acceleration corresponding to the translational movement in the environment may be configured to minimize the potential for motion sickness in the environment and better represent the actual movement characteristics of the user more accurately. Further, the platform may display a reference point indicator on the head mounted device.

The platform may then receive a second trigger in stage 810. The second trigger may be received in real-time or offset from real time. In some embodiments the platform may receive the second trigger from one of the following: a physical switch or button, brainwave reader or EEG, or other types of triggering mechanisms. Accordingly, the platform may establish the position of the head mounted device at the time the second trigger is received as a second reference position in stage 812. The platform may maintain the movement vector generated in stage 808, which may include maintaining the translational movement speed and/or direction of the user in the extended reality environment.

Responsive to receiving the second trigger, the platform may capture second subsequent position data at stage 814. In some embodiments, the second subsequent position data may be captured as a change from the second reference position. Further embodiments of the present disclosure may capture second subsequent position data as raw data and utilize the platform to compare the captured second subsequent position data to the captured second reference position. The second trigger can be engaged to control the elevation change of the user's movement. Additionally, the platform can measure or calculate the change in pitch of the head mounted device, relative to the second reference position. The pitch of the head mounted device may be associated the with movement of a user's head. From the second reference position the platform can control the elevation change of the user avatar movement within the environment.

The platform may modify the movement vector in stage 816. In embodiments, the movement vector of the user avatar in the extended reality environment may be modified based at least in part on the captured second reference position and/or the captured second subsequent position data. As the platform captures subsequent position data from the second position associated with the head mounted device, the platform may change the pitch of the user's movement in the extended reality environment based on the comparison of the second reference position and the current position of the head mounted device. Additionally, the platform may control the elevation change of the use avatar movement within the extended reality environment.

Upon release of the triggers, the movement of the user avatar may immediately cease. Alternatively, upon release of the triggers, the movement of the user avatar may be configured to decelerate at a rate that would more accurately represent the motion that is taking place.

In some embodiments, upon release of the first trigger, the user may determine whether the platform should end all movement in the extended reality environment, or end the translational movement, while maintaining any elevation change movement. In some embodiments, upon release of the second trigger, the user may determine whether the platform should end all movement in the extended reality environment, or end the elevation change movement, while maintaining any translational movement. In this way, the platform may be configured to allow for multi-trigger, multi-axis movement in an extended reality environment.

Embodiments of the present disclosure provide a hardware and software platform 100 operative as a distributed system of modules and computing elements.

Platform 100 may be embodied as, for example, but not be limited to, a website, a web application, a desktop application, backend application, and a mobile application compatible with a computing device 900. The computing device 900 may comprise, but not be limited to the following:

Mobile computing device, such as, but is not limited to: a laptop, a tablet, a smartphone, a mobile extended reality headset, a drone, a wearable, augmented reality glasses, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to: an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to: a server, wherein a server may be rack mounted, a workstation, an industrial device, a raspberry pi, a desktop, or an embedded device;

Platform 100 may be hosted on a centralized server or a cloud computing service. Although method 6000 has been described to be performed by a computing device 900, it should be understood that, in some embodiments, different operations may be performed by a plurality of the computing devices 900 in operative communication in at least one network.

Embodiments of the present disclosure may comprise a system having a Central Processing Unit (CPU) 920, a bus 930, a memory unit 940, a Power Supply Unit (PSU) 950, and one or more Input/Output (I/O) units. The CPU 920 coupled to the memory unit 940 and the plurality of I/O units 960 via the bus 930, all of which are powered by the PSU 950. It should be understood that, in some embodiments, each disclosed unit may actually be a plurality of such units for the purposes of redundancy, high availability, and/or performance. The combination of the presently disclosed units is configured to perform the stages of any method disclosed herein.

Figure 9:
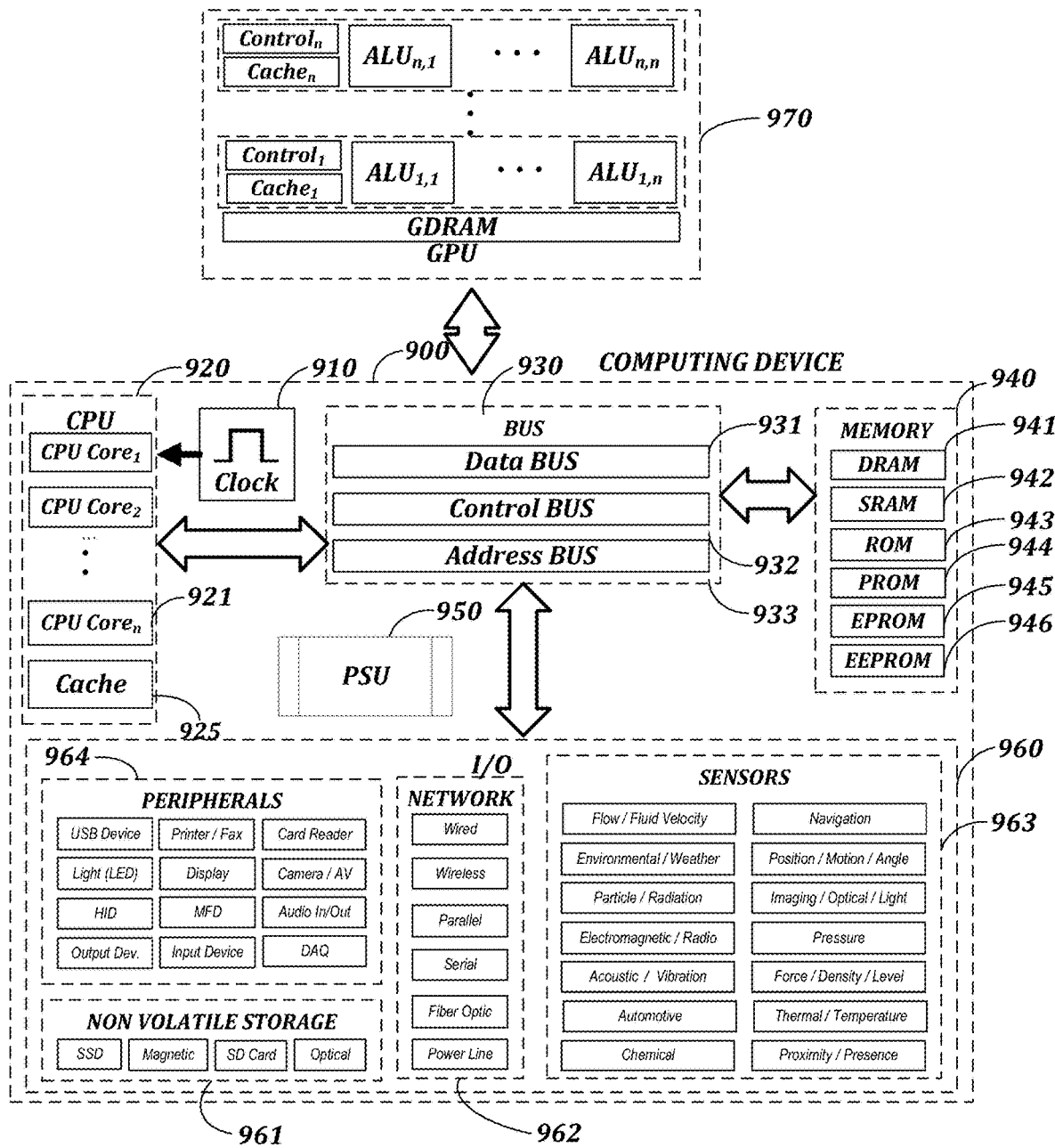
FIG. 9 is a block diagram of a system including a computing device for performing any of the methods of FIGS. 6-8.

FIG. 9 is a block diagram of a system including computing device 900. Consistent with an embodiment of the disclosure, the aforementioned CPU 920, the bus 930, the memory unit 940, a PSU 950, and the plurality of I/O units 960 may be implemented in a computing device, such as computing device 900 of FIG. 9. Any suitable combination of hardware, software, or firmware may be used to implement the aforementioned units. For example, the CPU 920, the bus 930, and the memory unit 940 may be implemented with computing device 900 or any of the other computing devices of type 900, in combination with computing device 900. The aforementioned system, device, and components are examples and other systems, devices, and components may comprise the aforementioned CPU 920, the bus 930, the memory unit 940, consistent with embodiments of the disclosure.

At least one computing device 900 may be embodied as any of the computing elements illustrated in all of the attached figures, including the controller module, the head mounted display module, the sensor module, and the processing module. A computing device 900 does not need to be electronic, nor even have a CPU 920, nor bus 930, nor memory unit 940. The definition of the computing device 900 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 900, especially if the processing is purposeful.

With reference to FIG. 89, a system consistent with an embodiment of the disclosure may include a computing device, such as computing device 900. In a basic configuration, computing device 900 may include at least one clock module 910, at least one CPU 920, at least one bus 930, and at least one memory unit 940, at least one PSU 950, and at least one I/O 960 module, wherein I/O module may be comprised of, but not limited to: a non-volatile storage sub-module 961, a communication sub-module 962, a sensors sub-module 963, and a peripherals sub-module 964.

A system consistent with an embodiment of the disclosure of the computing device 900 may include the clock module 910 may be known to a person having ordinary skill in the art as a clock generator, which produces clock signals. A clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 920, the central component of modern computers, which relies on a clock. The only exceptions are asynchronous circuits such as asynchronous CPUs. The clock 910 can comprise a plurality of embodiments, such as, but not limited to, single-phase clocks which transmit all clock signals on effectively 1 wire, two-phase clocks which distribute clock signals on two wires, each with non-overlapping pulses, and four-phase clocks which distribute clock signals over 4 wires.

Many computing devices 900 use a "clock multiplier" which multiplies a lower frequency external clock to the appropriate clock rate of the CPU 920. This allows the CPU 920 to operate at a much higher frequency than the rest of the computer, which affords performance gains in situations where the CPU 920 does not need to wait on an external factor (like memory 940 or input/output 960). Some embodiments of the clock 910 may include dynamic frequency change, where the time between clock edges can vary widely from one edge to the next and back again.

A system consistent with an embodiment of the disclosure via the computing device 900 may include the CPU unit 920 comprising at least one CPU Core 921. A plurality of CPU cores 921 may comprise identical CPU cores 921, such as, but not limited to, homogeneous multi-core systems. It is also possible for the plurality of CPU cores 921 to comprise different CPU cores 921, such as, but not limited to, heterogeneous multi-core systems, big.LITTLE systems and some Accelerated Processing Units (APU). The CPU unit 920 reads and executes program instructions which may be used across many application domains; for example, but not limited to, general purpose computing, embedded computing, network computing, Digital Signal Processing (DSP), and Graphics Processing Units (GPU). The CPU unit 920 may run multiple instructions on separate CPU cores 921 at the same time. The CPU unit 920 may be integrated into at least one of a single integrated circuit die and multiple dies in a single chip package. The single integrated circuit die and multiple dies in a single chip package may contain a plurality of other aspects of the computing device 900; for example, but not limited to, the clock 910, the CPU 920, the bus 930, the memory 940, and I/O 960.

The CPU unit 920 may contain cache 922 such as, but not limited to, a level 1 cache, level 2 cache, level 3 cache or combination thereof. The aforementioned cache 922 may or may not be shared amongst a plurality of CPU cores 921. The cache 922 sharing comprises at least one of message passing and inter-core communication methods may be used for the at least one CPU Core 921 to communicate with the cache 922. The inter-core communication methods may comprise, but is not limited to, bus, ring, two-dimensional mesh, and crossbar. The aforementioned CPU unit 920 may employ symmetric multiprocessing (SMP) design.

The plurality of the aforementioned CPU cores 921 may comprise soft microprocessor cores on a single Field Programmable Gate Array (FPGA), such as semiconductor intellectual property cores (IP Core). The plurality of CPU cores 921 architecture may be based on at least one of, but not limited to, Complex Instruction Set Computing (CISC), Zero Instruction Set Computing (ZISC), and Reduced Instruction Set Computing (RISC). At least one of the performance-enhancing methods may be employed by the plurality of the CPU cores 921, for example, but not limited to Instruction-Level Parallelism (ILP) such as, but not limited to, superscalar pipelining, and Thread-Level Parallelism (TLP).

A Graphics Processing Unit (GPU) is a processing unit that specializes in repetitive and highly-parallel computing. While a CPU computes tasks in a serial manner, a GPU computes in a parallel manner. In one non-limiting example, many gaming devices and modern computers have a Graphics Processing Unit (GPU) 980 that often works in tandem with the device's built in CPU to handle large and/or complicated data sets. The enclosed unit consists of a plurality of cores carrying out instruction sets of a distributive nature, often used for but not limited to processing graphics, large datasets, and complex computations.

Consistent with the embodiments of the present disclosure, the aforementioned computing device 900 may employ a communication system that transfers data between components inside the aforementioned computing device 900, and/or the plurality of computing devices 900. The aforementioned communication system will be known to a person having ordinary skill in the art as a bus 930. The bus 930 may embody internal and/or external plurality of hardware and software components; for example, but not limited to a wire, optical fiber, communication protocols, and any physical arrangement that provides the same logical function as a parallel electrical bus. The bus 930 may comprise at least one of, but not limited to a parallel bus, wherein the parallel bus carry data in parallel on multiple wires, and a serial bus, wherein the serial bus carry data in bit-serial form. The bus 930 may embody a plurality of topologies; for example, but not limited to, a multidrop/electrical parallel topology, a daisy chain topology, and switch hubs, such as a USB bus. The bus 930 may comprise a plurality of embodiments, for example, but not limited to:

Internal data bus (data bus) 931/Memory bus
Control bus 932
Address bus 933
System Management Bus (SMBus)
Front-Side-Bus (FSB)
External Bus Interface (EBI)
Local bus
Expansion bus
Lightning bus
Inter-Integrated Circuit (I2C)
SenseWire (I3C)
Serial Peripheral Interface (SPI)
Universal Asynchronous Receiver-Transmitter (UART)
High-Definition Multimedia Interface (HDMI)
DisplayPort (DP)
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCIe) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, eXtensible Host Controller Interface (xHCI), USB2, USB3, and USB4.

Consistent with the embodiments of the present disclosure, the aforementioned computing device 900 may employ hardware integrated circuits that store information for immediate use in the computing device 900, known to the person having ordinary skill in the art as primary storage or memory 940. The memory 940 operates at high speed, distinguishing it from the non-volatile storage sub-module 961, which may be referred to as secondary or tertiary storage, which provides slow-to-access information but offers higher capacities at lower cost. The contents contained in memory 940 may be transferred to secondary storage via techniques such as, but not limited to, virtual memory and swap. The memory in 940 may be associated with addressable semiconductor memory, such as integrated circuits consisting of silicon-based transistors, used for example as primary storage but also for other purposes in the computing device 900. The memory 940 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 941, Static Random-Access Memory (SRAM) 942, CPU Cache memory 925, Advanced Random-Access Memory (A-RAM), and other types of primary storage such as Random-Access Memory (RAM).
Non-volatile memory which can retain stored information even after power is removed, for example, but not limited to, Read-Only Memory (ROM) 943, Programmable ROM (PROM) 944, Erasable PROM (EPROM) 945, Electrically Erasable PROM (EEPROM) 946 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.
Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but is not limited to spin-transfer torque RAM (STT-RAM).

Consistent with the embodiments of the present disclosure, the aforementioned computing device 900 may employ the communication system between an information processing system, such as the computing device 900, and the outside world, for example, but not limited to, human, environment, and another computing device 900. The aforementioned communication system will be known to a person having ordinary skill in the art as I/O 960. The I/O module 960 regulates a plurality of inputs and outputs with regard to the computing device 900, wherein the inputs are a plurality of signals and data received by the computing device 900, and the outputs are the plurality of signals and data sent from the computing device 900. The I/O module 960 interfaces a plurality of hardware, such as, but not limited to, non-volatile storage 961, communication devices 962, sensors 963, and peripherals 964. The plurality of hardware is used by at least one of, but not limited to, human, environment, and another computing device 900 to communicate with the present computing device 900. The I/O module 960 may comprise a plurality of forms, for example, but not limited to channel I/O, port mapped I/O, asynchronous I/O, and Direct Memory Access (DMA).

Consistent with the embodiments of the present disclosure, the aforementioned computing device 900 may employ the non-volatile storage sub-module 961, which may be referred to by a person having ordinary skill in the art as one of secondary storage, external memory, tertiary storage, off-line storage, and auxiliary storage. The non-volatile storage sub-module 961 may not be accessed directly by the CPU 920 without using intermediate area in the memory 940. The non-volatile storage sub-module 961 does not lose data when power is removed and may be two orders of magnitude less costly than storage used in memory module, at the expense of speed and latency. The non-volatile storage sub-module 961 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (961) may comprise a plurality of embodiments, such as, but not limited to:

- Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).
- Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.
- Magnetic storage such as, but not limited to, Hard Disk Drive (HDD), tape drive, carousel memory, and Card Random-Access Memory (CRAM).
- Phase-change memory
- Holographic data storage such as Holographic Versatile Disk (HVD).
- Molecular Memory
- Deoxyribonucleic Acid (DNA) digital data storage Consistent with the embodiments of the present disclosure, the aforementioned computing device 900 may employ the communication sub-module 962 as a subset of the I/O 960, which may be referred to by a person having ordinary skill in the art as at least one of, but not limited to, computer network, data network, and network. The network allows computing devices 900 to exchange data using connections, which may be known to a person having ordinary skill in the art as data links between network nodes. The nodes comprise network computer devices 900 that originate, route, and terminate data. The nodes are identified by network addresses and can include a plurality of hosts consistent with the embodiments of a computing device 900. The aforementioned embodiments include, but are not limited to personal computers, phones, servers, drones, and networking devices such as, but not limited to, hubs, switches, routers, modems, and firewalls.

Two nodes can be said to be networked together, when one computing device 900 is able to exchange information with the other computing device 900, whether or not they have a direct connection with each other. The communication sub-module 962 supports a plurality of applications and services, such as, but not limited to World Wide Web (WWW), digital video and audio, shared use of application and storage computing devices 900, printers/scanners/fax machines, email/online chat/instant messaging, remote control, distributed computing, etc. The network may comprise a plurality of transmission mediums, such as, but not limited to conductive wire, fiber optics, and wireless (E-M spectrum: radio, light, UV, IR). The network may comprise a plurality of communications protocols to organize network traffic, wherein application-specific communications protocols are layered, may be known to a person having ordinary skill in the art as carried as payload, over other more general communications protocols. The plurality of communications protocols may comprise, but are not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 962 may comprise a plurality of size, topology, traffic control mechanism and organizational intent. The communication sub-module 962 may comprise a plurality of embodiments, such as, but not limited to:

- Wired communications, such as, but not limited to, coaxial cable, phone lines, twisted pair cables (ethernet), and InfiniBand.
- Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength).
- Parallel communications, such as, but not limited to, LPT ports.

Serial communications, such as, but not limited to, RS-232 and USB.

Fiber Optic communications, such as, but not limited to, Single-Mode optical Fiber (SMF) and Multi-Mode optical Fiber (MMF).

Power Line communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but are not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 900 may employ the sensors sub-module 963 as a subset of the I/O 960. The sensors sub-module 963 comprises at least one of the devices, modules, and subsystems whose purpose is to detect events or changes in its environment and send the information to the computing device 900. Sensors are sensitive to the measured property, are not sensitive to any property not measured, but may be encountered in its application, and do not significantly influence the measured property. The sensors sub-module 963 may comprise a plurality of digital devices and analog devices, wherein if an analog device is used, an Analog to Digital (A-to-D) converter must be employed to interface the said device with the computing device 900. The sensors may be subject to a plurality of deviations that limit sensor accuracy. The sensors sub-module 963 may comprise a plurality of embodiments, such as, but not limited to, chemical sensors, automotive sensors, acoustic/sound/vibration sensors, electric current/capacitive/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, capacitor, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, altitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 900 may employ the peripherals sub-module 962 as a subset of the I/O 960. The peripheral sub-module 964 comprises ancillary devices used to put information into and get information out of the computing device 900. There are 3 categories of devices comprising the peripheral sub-module 964, which exist based on their relationship with the computing device 900; input devices, output devices, and input/output devices. Input devices send at least one of data and instructions to the computing device 900. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to, position of a mouse.

The number of degrees of freedom involved, such as, but not limited to, two-dimensional computer mice vs three-dimensional computer mice used for Computer-Aided Design (CAD) applications.

Output devices provide output from the computing device 900. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 964:

Input Devices
Human Interface Devices (HID), such as, but not limited to, pointing devices (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and extended reality systems.

Video Input devices are used to digitize images or video from the outside world into the computing device 900. The information can be stored in a multitude of formats depending on the user's requirement. Examples of types of video input devices include, but are not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 900 for at least one of the tasks of processing, recording, or carrying out commands. Devices such as microphones allow users to speak to the computer in order to record a voice message or navigate software. Aside from recording, audio input devices are also used with speech recognition software. Examples of types of audio input devices include, but are not limited to microphone, Musical Instrumental Digital Interface (MIDI) devices such as, but not limited to a keyboard, and headset.

Data AcQuisition (DAQ) devices convert at least one of analog signals and physical parameters to digital values for processing by the computing device 900. Examples of DAQ devices may include, but are not limited to, Analog to Digital Converter (ADC), data logger, signal conditioning circuitry, multiplexer, and Time to Digital Converter (TDC).

Output Devices may further comprise, but are not limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers, and lights, which include lamps, strobes, DJ lighting, stage lighting, architectural lighting, special effect lighting, and lasers.

Other devices such as Digital to Analog Converter (DAC)

Input/Output Devices may further comprise, but are not limited to, touchscreens, networking device (e.g., devices disclosed in network 962 sub-module), data storage device (non-volatile storage 961), facsimile (FAX), and graphics/sound cards.

All rights including copyrights in the code included herein are vested in and are the property of the Applicant. The Applicant retains and reserves all rights in the code included herein, and grants permission to reproduce the material only in connection with reproduction of the granted patent and for no other purpose.

IV. ASPECTS

The following disclose various Aspects of the present disclosure. The various Aspects are not to be construed as patent claims unless the language of the Aspect appears as a patent claim. The Aspects describe various non-limiting embodiments of the present disclosure.

Aspect 1. A method of moving throughout an extended reality environment, the method comprising:
collecting raw sensor data from the head mounted device;
processing the raw sensor data from the head mounted device;
receiving a first trigger to set a first reference position for the head mounted device;
comparing subsequent sensor data to the first reference position;
displaying the determined translational movement of the user based on the comparison of the subsequent sensor data to the first reference position;
displaying the determined translational movement on the head mounted device receiving a second trigger to maintain the translational movement of the user and set a second reference position for the head mounted device;
comparing subsequent sensor data to the second reference position;
determining elevation change of the user's movement based on the comparison of the subsequent sensor data relating to the device's pitch to the second reference position;
combining the translational movement and the elevation change into a movement vector; and
displaying the movement vector on the head mounted device.

Aspect 2. A method of moving throughout an extended reality environment, the method comprising:
engaging a first trigger to engage a first reference position;
moving a head mounted device in the desired translation direction of travel;
engaging a second trigger to capture a second reference position;
moving the head mounted device in the direction of desired elevation change when compared to the second reference position; and
moving throughout the extended reality environment in the resulting movement vector.

Aspect 3. One or more non-transitory computer readable media comprising instructions which, when executed by one or more hardware processors, causes performance of operations comprising:
receiving a first trigger to set a first reference position for a head mounted device;
responsive to receiving the first trigger, collecting raw sensor data about a user from the head mounted device;
processing the raw sensor data from the head mounted device to determine the first reference position of a user's head;
collecting subsequent sensor data associated with movement of the head mounted device from the head mounted device;
comparing the subsequent sensor data to the first reference position to determine a change in pitch of the user's head;
correlating the change in pitch of the user's head to an anticipated direction of anticipated movement by the user's vestibular system within the extended reality environment;
determining translational movement of the user based on the comparison of the subsequent sensor data to the first reference position and the anticipated direction of movement; and
moving a representation of the user through the extended reality environment based on the determined translational movement.

V. CLAIMS

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method of moving through an extended reality environment, the method comprising:
receiving a first trigger to set a first reference position for a head mounted device;
responsive to receiving the first trigger, collecting raw sensor data about a user from the head mounted device;
processing the raw sensor data from the head mounted device to determine the first reference position of a user's head;
collecting subsequent sensor data associated with movement of the head mounted device from the head mounted device;
comparing the subsequent sensor data to the first reference position to determine a change in pitch of the user's head;
correlating the change in pitch of the user's head to a direction of anticipated movement of a representation of the user within the extended reality environment, by the user's vestibular system;
determining translational movement of the representation of the user within the extended reality environment, based on the change in pitch of the user's head and the direction of anticipated movement; and
moving the representation of the user through along one or more of the x, y, or z axes within the extended reality environment based on the determined translational movement.

2. The method of claim 1, wherein collecting the subsequent sensor data from the head mounted device comprises measuring changes in position of the head mounted device about a plurality of axes.

3. The method of claim 1, wherein processing the raw sensor data from the head mounted device comprises correlating a relative orientation of the head mounted device to the user's vestibular system.

4. The method of claim 1, wherein the first trigger is received from an electroencephalogram (EEG) sensor.

5. The method of claim 1, wherein the first trigger is received from a brainwave sensor.

6. The method of claim 1, wherein moving the representation of the user through the extended reality environment further comprises controlling a remote system, the remote system including at least one of a robot or a drone in a real environment, such that at least a portion of the remote system moves in a manner consistent with the movement of the representation of the user.

7. The method of claim 1, wherein moving the representation of the user through the extended reality environment comprises displaying the determined translational movement on the head mounted device and an indication of the movement taking place.

8. The method of claim 1, further comprising:
receiving a second trigger to maintain the translational movement of the user; and
responsive to receiving the second trigger, collecting raw sensor data about the user from the head mounted device; and
processing the raw sensor data from the head mounted device to set a second reference position for the head mounted device.

9. The method of claim 8 further comprising:
collecting second subsequent sensor data associated with movement of the head mounted device from the head mounted device; and
comparing the second subsequent sensor data to the second reference position to determine a second change in pitch of the user's head.

10. The method of claim 9 further comprising determining an elevation change of the representation of the user based on the comparison of the second subsequent sensor data to the second reference position, wherein the elevation change corresponds to the second change in pitch of the user's head.

11. The method of claim 10, further comprising combining the translational movement and the elevation change into a movement vector.

12. The method of claim 11 further comprising displaying the movement of the representation of the user through the extended reality environment and an indication of the movement vector.

13. A system for moving throughout an extended reality environment, the system comprising:
a first trigger mechanism configured to initiate capture of a first reference position of a user's head;
a head mounted device in communication with the first trigger mechanism, the head mounted device configured to capture data related to a position of the user's head,
wherein the head mounted device comprises a plurality of sensors configured to capture data associated with:
a first orientation of the user's head in the first reference position, and
a subsequent orientation of the user's head in a subsequent position, and
a processor in communication with the head mounted device, the processor being configured to:
determine a change in orientation of the user's head from the first orientation to the subsequent orientation;
correlate the change in orientation of the user's head with a direction of anticipated movement of a representation of the user within the extended reality environment, by the user's vestibular system;
determine a translational movement of the representation of the user within the extended reality environment, based on the change in orientation and the direction of anticipated movement; and moving the representation of the user along one or more of the x, y, or z axes within the extended reality environment based on the determined translational movement.

14. The system of claim 13, wherein the first trigger mechanism comprises at least one of a brainwave sensor connected to the user's head and an electroencephalogram (EEG) sensor.

15. The system of claim 14, wherein the plurality of sensors of the head mounted device are configured to capture movement data of the head mounted device about a plurality of axes.

16. The system of claim 14, wherein the processor is configured to correlate the movement of the representation of the user in the extended reality environment to movement in a remote system, the remote system including at least one of a robot or a drone.

17. The system of claim 14, wherein the head mounted device comprises a display configured to display the determined translational movement on the head mounted device, wherein the display shows the translational movement throughout the extended reality environment.

18. The system of claim 14, further comprising a second trigger mechanism in communication with the head mounted device, the second trigger mechanism configured to maintain the translational movement of the user and set a second reference position for the head mounted device.

19. The system of claim 18, wherein the head mounted device is further configured to measure movement of the head mounted device after the second trigger to control at least one of: a pitch of the movement throughout the extended reality environment and a yaw of the movement throughout the extended reality environment.

20. One or more non-transitory computer readable media comprising instructions which, when executed by one or more hardware processors, causes performance of operations comprising:
receiving a first trigger to set a first reference position for a head mounted device;
responsive to receiving the first trigger, collecting raw sensor data about a user from the head mounted device;
processing the raw sensor data from the head mounted device to determine the first reference position of a user's head;
collecting subsequent sensor data associated with movement of the head mounted device from the head mounted device;
comparing the subsequent sensor data to the first reference position to determine a change in pitch of the user's head;
correlating the change in pitch of the user's head to a direction of anticipated movement of a representation of the user within the extended reality environment, by the user's vestibular system;
determining translational movement of the representation of the user within the extended reality environment, based on the change in pitch of the user's head and the direction of anticipated movement; and
moving the representation of the user along one or more of the x, y, or z axes within the extended reality environment based on the determined translational movement.

* * * * *